(12) United States Patent
Schmid et al.

(10) Patent No.: US 10,280,090 B2
(45) Date of Patent: May 7, 2019

(54) CONVERSION OF METAL CARBONATE INTO METAL CHLORIDE

(71) Applicant: Siemens Aktiengesellschaft, Munich (DE)

(72) Inventors: Guenter Schmid, Hemhofen (DE); Dan Taroata, Erlangen (DE); Ralf Krause, Herzogenaurach (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 139 days.

(21) Appl. No.: 15/119,015

(22) PCT Filed: Feb. 9, 2015

(86) PCT No.: PCT/EP2015/052640
§ 371 (c)(1),
(2) Date: Aug. 15, 2016

(87) PCT Pub. No.: WO2015/121196
PCT Pub. Date: Aug. 20, 2015

(65) Prior Publication Data
US 2017/0001875 A1  Jan. 5, 2017

(30) Foreign Application Priority Data

Feb. 13, 2014 (DE) .................. 10 2014 202 591

(51) Int. Cl.

| | | |
|---|---|---|
| *C01D 15/04* | (2006.01) | |
| *C01F 5/32* | (2006.01) | |
| *C01G 9/04* | (2006.01) | |
| *C01F 7/60* | (2006.01) | |
| *C01B 9/02* | (2006.01) | |
| *C01D 3/04* | (2006.01) | |
| *C01F 11/28* | (2006.01) | |
| *B01J 8/00* | (2006.01) | |
| *B01J 8/02* | (2006.01) | |
| *B01J 8/08* | (2006.01) | |
| *B01J 8/14* | (2006.01) | |
| *B01J 19/08* | (2006.01) | |
| *B01J 19/24* | (2006.01) | |
| *C01B 32/40* | (2017.01) | |
| *C01B 32/50* | (2017.01) | |
| *C01B 32/60* | (2017.01) | |
| *C22B 26/12* | (2006.01) | |

(52) U.S. Cl.
CPC ............ *C01D 15/04* (2013.01); *B01J 8/005* (2013.01); *B01J 8/0015* (2013.01); *B01J 8/02* (2013.01); *B01J 8/0292* (2013.01); *B01J 8/085* (2013.01); *B01J 8/14* (2013.01); *B01J 19/088* (2013.01); *B01J 19/245* (2013.01); *C01B 9/02* (2013.01); *C01B 32/40* (2017.08); *C01B 32/50* (2017.08); *C01B 32/60* (2017.08); *C01D 3/04* (2013.01); *C01F 5/32* (2013.01); *C01F 7/60* (2013.01); *C01F 11/28* (2013.01); *C01G 9/04* (2013.01); *B01J 2208/00752* (2013.01); *B01J 2208/00761* (2013.01); *B01J 2208/00893* (2013.01); *B01J 2208/02* (2013.01); *B01J 2219/0805* (2013.01); *B01J 2219/0877* (2013.01); *C22B 26/12* (2013.01)

(58) Field of Classification Search
CPC .. C01B 9/02; C01D 15/02; C01D 3/04; C01F 11/28; C22B 26/12
See application file for complete search history.

(56) References Cited

U.S. PATENT DOCUMENTS

| | | | |
|---|---|---|---|
| 3,488,143 A | 1/1970 | Wendell et al. | 423/79 |
| 4,096,234 A | 6/1978 | Martin et al. | 423/135 |
| 5,089,094 A | 2/1992 | Ogasawara et al. | 205/405 |
| 5,683,669 A | 11/1997 | Hartmann et al. | 423/491 |
| 6,048,507 A | 4/2000 | Amouzegar et al. | 423/179.5 |
| 2003/0024449 A1 | 2/2003 | Martin et al. | 110/268 |
| 2005/0006247 A1 | 1/2005 | Vandenhaute et al. | 205/606 |
| 2005/0118088 A1* | 6/2005 | Olbert | B01J 8/001 423/416 |
| 2006/0231493 A1 | 10/2006 | Procida | 210/651 |
| 2007/0224109 A1* | 9/2007 | Chaifetz | C01B 9/02 423/491 |
| 2010/0051470 A1 | 3/2010 | Nakamura et al. | 205/407 |

(Continued)

FOREIGN PATENT DOCUMENTS

| | | | | |
|---|---|---|---|---|
| CA | 2340528 A1 | 9/2001 | | C25B 1/24 |
| DE | 1667419 B2 | 4/1978 | | C01B 33/08 |

(Continued)

OTHER PUBLICATIONS

U.S. Final Office Action, U.S. Appl. No. 15/118,966, 13 pages, dated Apr. 20, 2018.
Zhiging, Zhu, "Chemical Engineering," ISBN: 978-7-122-10572-1, Chemical Industry Press, p. 191 (Chinese w/ English Statement of Relevance), May 31, 2011.
Russian Office Action, Application No. 2016130847/05(047940), 7 pages, dated Nov. 30, 2017.
Chinese Office Action, Application No. 201580008652.2, 29 pages, dated Dec. 13, 2017.

(Continued)

*Primary Examiner* — Ngoc-Yen Nguyen
(74) *Attorney, Agent, or Firm* — Slayden Grubert Beard PLLC

(57) ABSTRACT

A method for producing metal chloride $M^{x+}Cl^{x-}$ includes reacting metal carbonate in solid form using phosgene, diphosgene and/or triphosgene to form metal chloride $M^{x+}Cl^{x-}$, wherein the metal M is selected from the group containing alkali metals, alkaline earth metals, Al and Zn, Li and Mg, or Li, for example, and x corresponds to the valency of the metal cations. An apparatus for performing such method is also disclosed.

8 Claims, 7 Drawing Sheets

(56) References Cited

U.S. PATENT DOCUMENTS

| | | | |
|---|---|---|---|
| 2013/0001097 A1 | 1/2013 | Nakamura et al. | 205/407 |
| 2013/0260263 A1 | 1/2013 | Nishijima | 200/600 |
| 2014/0262792 A1* | 9/2014 | Rosenthal | C25B 11/0447 205/50 |
| 2015/0159285 A1 | 6/2015 | Baldauf et al. | 205/560 |

FOREIGN PATENT DOCUMENTS

| | | | |
|---|---|---|---|
| DE | 10137520 A1 | 2/2003 | F23B 30/02 |
| EA | 200400497 A1 | 10/2004 | C01G 9/04 |
| EA | 013159 B1 | 2/2010 | A62D 3/00 |
| EP | 0007803 A1 | 2/1980 | C01F 5/32 |
| EP | 1685892 A1 | 8/2006 | B01D 67/00 |
| GB | 561651 A | 5/1944 | C25C 3/02 |
| JP | 02243510 A | 9/1990 | C01F 5/32 |
| RU | 2288217 C1 | 11/2006 | C07C 68/06 |
| SU | 818475 A3 | 3/1981 | C01F 7/56 |
| WO | 2010/000681 A2 | 1/2010 | C05C 1/00 |
| WO | 2010/000681 A3 | 3/2010 | C05C 1/00 |
| WO | 2012/038330 A2 | 3/2012 | B01D 53/62 |
| WO | 2012/038330 A3 | 5/2013 | B01D 53/62 |
| WO | 2013/156476 A1 | 10/2013 | B01D 53/50 |
| WO | 2014/005878 A1 | 1/2014 | C22B 26/00 |
| WO | 2015/121192 A1 | 8/2015 | C01B 9/02 |
| WO | 2015/121196 A1 | 8/2015 | C01B 9/02 |

OTHER PUBLICATIONS

Li, Qingwei, "Ten Safe Operative Technologies and Accident Rescue Application Manual for Hazardous Chemicals," Chinese Book Publishing House, p. 1499 (2 pages), 2005.

Chinese Office Action, Application No. 201580008453.1, 16 pages, dated Apr. 6, 2017.

Chinese Office Action, Application No. 201580008652.2, 27 pages, dated Apr. 26, 2017.

Russian Office Action, Application No. 2016133304/04, 7 pages, dated Oct. 11, 2017.

U.S. Non-Final Office Action, U.S. Appl. No. 15/118,966, 20 pages, dated Oct. 6, 2017.

"Database WPI," Section Ch, Week 199045; 1990; Thomson Scientific, London, GB; AN 1990-338383; XP002739468, Mar. 16, 1989.

Deberitz, Jürgen, "Lithium, Production and Application of a Fascinating and Versatile Element," Die Bibliotek der Wissenschaft, vol. 2, pp. 37-41, 2006.

"Heated Lithium Placed in Chlorine," Free Science Videos and Lectures Online, URL: http://www.youtube.com/watch?v+ryx5f9CIA-c, 1 pages, 2007.

Hori, Y., "Electrochemical $CO_2$ Reduction on Metal Electrodes," Modern Aspects of Electrochemistry, No. 42, pp. 89-189, 2008.

van Loo, Sjaak et al., "The Handbook of Biomass Combustion & Co-Firing," Earthscan, pp. 134-144, 2008.

Rosen, Brian A. et al., "Ionic Liquid-Mediated Selective Conversion of $CO_2$ to CO at Low Overpotentials," Science, vol. 334, pp. 643-644, Nov. 4, 2011

DiMeglio, John L. et al., "Selective Conversion of $CO_2$ to CO with High Efficiency Using an Inexpensive Bismuth-Based Electrocatalyst," Journal of the American Chemical Society, vol. 135, 16 pages, Jun. 4, 2013.

German Office Action, Application No. 102014202591.5, 5 pages, dated Mar. 7, 2014.

German Office Action, Application No. 102014202593.1, 8 pages, dated Oct. 28, 2014.

International Search Report and Written Opinion, Application No. PCT/EP2015/052621, 30 pages, dated May 26, 2015.

International Search Report and Written Opinion, Application No. PCT/EP2015/052640, 25 pages, dated Jun. 1, 2015.

\* cited by examiner

CONVERSION OF METAL CARBONATE INTO METAL CHLORIDE

CROSS-REFERENCE TO RELATED APPLICATIONS

This application is a U.S. National Stage Application of International Application No. PCT/EP2015/052640 filed Feb. 9, 2015, which designates the United States of America, and claims priority to DE Application No. 10 2014 202 591.5 filed Feb. 13, 2014, the contents of which are hereby incorporated by reference in their entirety.

TECHNICAL FIELD

The present invention relates to a method for producing metal chloride $M^{x+}Cl_x^-$, wherein metal carbonate as solid is reacted with phosgene, diphosgene and/or triphosgene to give metal chloride $M^{x+}Cl_x^-$, the metal M being selected from the group of the alkali metals, alkaline earth metals, Al and Zn, preferably Li and Mg, more preferably Li, and x corresponding to the valence of the metal cation, and also to an apparatus for implementing the method.

BACKGROUND

WO 2012/038330 and WO 2013/156476 describe how flue gases/off-gases can be treated with the electropositive metals lithium or magnesium in order to give substances of value and high-level thermal energy and thereby to reduce the soiling of the atmosphere.

WO 2012/038330 demonstrates the reaction of $CO_2$ with lithium to give substances of value such as carbon monoxide or acetylene, which can be reacted further to given methanol or other substances of value. The thermal energy released can be utilized to drive the methanol/$CO_2$ separation or even to drive a steam generator.

Reactions and considerations that are relevant in this context include the following:

$2Li+CO_2 \rightarrow Li_2O+CO-314.9$ kJ/mol (comparison: $C+O_2 \rightarrow CO_2-393.5$ kJ/mol)

$4Li+CO_2 \rightarrow 2Li_2O+C-803.94$ kJ/mol $C+CO_2 \rightarrow 2CO+172.5$ kJ/mol; which can be converted into methanol $2C+2Li \rightarrow Li_2C_2$; which can be converted into acetylene (ratio $CO_2$:Li)

$Li_2CO_3+4C \rightarrow Li_2C_2+3CO$ $Li_2O+CO_2 \rightarrow Li_2CO_3$; $Li_2CO_3 \rightarrow Li_2O+CO_2$ at the relevant temperatures of around 1500° C.

Enthalpies of formation (298K): $Li_2O=-597.90$ kJ/mol; $Li_2CO_3=-1215.87$ kJ/mol.

$2Li+2CO_2 \rightarrow Li_2CO_3+CO-539$ kJ

After a hydrolysis, a strongly alkaline $Li_2CO_3$ suspension is obtained.

$Li_2C_2+H_2O \rightarrow HC\equiv CH+2LiOH$ $Li_2O+CO_2 \rightarrow Li_2CO_3$

WO 2013/156476 sets out how the treatments of flue gas/waste gas may also include a desulfurization in view of the high solubility of lithium-sulfur-based salts and the low solubility of lithium carbonate:

$6Li+SO_2 \rightarrow Li_2S+2Li_2O$ $8Li+SO_3 \rightarrow Li_2S+3Li_2O$ $Li_2O+SO_2 \rightarrow Li_2SO_3-438.7$ kJ/mol The suspension obtained after the combustion of $CO_2$ and $SO_2$ with a forced oxidation, said suspension containing $Li_2CO_3$ and $Li_2SO_4$, must then be separated. Fortunately, all lithium-sulfur salts are readily soluble in water (e.g., lithium sulfate at 350 g/l at room temperature (about 25° C.)). In contrast to $Na_2S_2O_5$, ready solubility is also possessed by $Li_2S_2O_5$ or $Li_2SO_3$. This means that all sulfur compounds remain in solution, while $Li_2CO_3$ (solubility 13 g/l) is formed as a precipitate and can be obtained as a fairly pure product for return (see WO 2010/000681). The ready solubility of lithium sulfate here is in contrast with that of $CaSO_4$ (2 g/l), which is prepared in a prior-art desulfurization process.

All of these process sequences end with a slightly wet, fairly pure lithium carbonate. The reduction of lithium carbonate to give metallic lithium may be achieved, for example, by reaction of the carbonate to give the chloride and by the subsequent electrolysis of a eutectic mixture of potassium/lithium chloride.

$Li_2CO_3+2HCl \rightarrow 2LiCl+H_2O+CO_2$ (reaction enthalpy: $-96$ kJ/mol 2. $Li_2CO_3+Cl_2 \rightarrow 2LiCl+1/2O_2+CO_2$ (reaction enthalpy: $\sim 5$ kJ/mol)    1.

In processes for preparation of lithium chloride for the production of lithium, customarily, either lithium carbonate or lithium hydroxide is caused to react with hydrochloric acid/hydrogen chloride acid in an aqueous solution. Following evaporation and crystallization, the crystals are isolated and dried, to give a highly hygroscopic anhydrous lithium chloride, as described in Jürgen Deberitz, Lithium, Die Bibliothek der Wissenschaft Vol. 2, pp. 37, 2006 (ISBN-13: 978-3-937889-36-8). A substantial difficulty in such a process, as set out in U.S. Pat. No. 6,048,507, is the high energy requirement of theoretically $30 \times 10^3$ kJ/kg. No attention at all has to date been paid to the energy source that is used for the chemical conversion.

A further process, which is described in CA 2340528 A1 and US 20130001097 A1, involves reacting lithium carbonate with chlorine gas to give anhydrous lithium chloride. Preparation of anhydrous lithium chloride from pulverulent lithium carbonate in a fluidized-bed reactor is described in WO 2014/005878.

There continues to be a demand for an improved process for the production of metal chloride from metal carbonate, improved not least in terms of energy.

SUMMARY

One embodiment provides a method for producing metal chloride $M^{x+}Cl_x^-$, wherein metal carbonate as solid is reacted with phosgene, diphosgene and/or triphosgene to give metal chloride $M^{x+}Cl_x^-$, the metal M being selected from the group of the alkali metals, alkaline earth metals, Al and Zn, preferably Li and Mg, more preferably Li, and x corresponding to the valence of the metal cation.

In one embodiment, M is additionally added as reactant.

In one embodiment, the metal M is used together with the metal carbonate, and/or phosgene, diphosgene and/or triphosgene is prepared in situ by reaction of chlorine with carbon monoxide.

In one embodiment, the metal chloride is subsequently reacted to give metal M, preferably electrolysis.

In one embodiment, the metal M produced is reacted at least partly with carbon dioxide to give metal carbonate, to form a metal circuit.

In one embodiment, the reaction takes place in a grid reactor or a mechanically moved fixed-bed reactor or in a cyclone reactor.

In one embodiment, the phosgene, diphosgene and/or triphosgene is prepared by the reaction of carbon monoxide and chlorine.

In one embodiment, the carbon monoxide comes from a reaction of metal carbonate with the metal M and/or from an electrolysis of carbon dioxide.

Another embodiment provides an apparatus for reacting metal carbonate as solid with phosgene, diphosgene and/or triphosgene to give metal chloride $M^{x+}Cl_x^-$, the metal M being selected from the group of the alkali metals, alkaline earth metals, Al and Zn, preferably Li and Mg, more preferably Li, and x corresponding to the valence of the metal cation, comprising: a first reactor for the reaction of metal carbonate and phosgene, diphosgene and/or triphosgene; a first supply means for metal carbonate, designed to introduce metal carbonate as solid into the first reactor; a second supply means for phosgene, diphosgene and/or triphosgene, designed to introduce phosgene, diphosgene and/or triphosgene into the first reactor; a first discharge means for metal chloride, designed to remove metal chloride from the first reactor; and a second discharge means for gaseous products of the reaction of metal carbonate and phosgene, diphosgene and/or triphosgene, designed to remove gaseous products of the reaction of metal carbonate and phosgene, diphosgene and/or triphosgene from the first reactor.

In one embodiment, the apparatus further comprises a third supply means for metal M, designed to introduce metal M into the first reactor.

Another embodiment provides an apparatus for reacting metal carbonate as solid with phosgene, diphosgene and/or triphosgene to give metal chloride $M^{x+}Cl_x^-$, the metal M being selected from the group of the alkali metals, alkaline earth metals, Al and Zn, preferably Li and Mg, more preferably Li, and x corresponding to the valence of the metal cation, metal M being additionally added as reactant, comprising: a first reactor for the reaction of metal carbonate and phosgene, diphosgene and/or triphosgene; a first supply means for metal carbonate, designed to introduce metal carbonate as solid into the first reactor; a seventh supply means for chlorine, designed to introduce chlorine into the first reactor; a first discharge means for metal chloride, designed to remove metal chloride from the first reactor; optionally at least one eighth supply means for carbon monoxide and/or phosgene, diphosgene and/or triphosgene, designed to introduce carbon monoxide and/or phosgene, diphosgene and/or triphosgene into the first reactor; and a second discharge means for gaseous products of the reaction of metal carbonate and phosgene, diphosgene and/or triphosgene, designed to remove gaseous products of the reaction of metal carbonate and phosgene, diphosgene and/or triphosgene from the first reactor, and further comprising a third supply means for metal M, designed to introduce metal M into the first reactor.

In one embodiment, the first reactor for the reaction of metal carbonate and the chlorinating agent is a grid reactor or a mechanically moved fixed-bed reactor or a cyclone reactor.

In one embodiment, the supply of metal M and metal carbonate into the first reactor takes place via a common opening in the first reactor.

In one embodiment, the apparatus further comprises an electrolysis means for metal chloride, designed to electrolyze metal chloride to give metal M and chlorine; a fourth supply means for metal chloride, connected to the first discharge means for metal chloride and designed to supply the metal chloride to the electrolysis means; a third discharge means for metal M, designed to remove metal M from the electrolysis means; and a fourth discharge means for chlorine, designed to remove chlorine from the electrolysis means.

In one embodiment, the apparatus further comprises a second reactor for the reaction of metal M with carbon dioxide to give metal carbonate, designed to react metal M with carbon dioxide; a fifth supply means for metal M, designed to supply metal M to a second reactor; a sixth supply means for carbon dioxide, designed to supply carbon dioxide to the second reactor; a fifth discharge means for metal carbonate, connected to the first supply means and designed to remove metal carbonate from the second reactor; and at least one sixth discharge means for the further products of the reaction of metal M and carbon dioxide, designed to discharge the further products of the reaction of metal M and carbon dioxide from the second reactor.

In one embodiment, the apparatus further comprises an electrolysis means for metal chloride, designed to electrolyze metal chloride to give metal M and chlorine; a fourth supply means of metal chloride, connected to the first discharge means for metal chloride and designed to supply the metal chloride to the electrolysis means; a third discharge means for metal M, designed to remove metal M from the electrolysis means; a fourth discharge means for chlorine, designed to remove chlorine from the electrolysis means; a second reactor for the reaction of metal M with carbon dioxide to give metal carbonate, designed to react metal M with carbon dioxide; a fifth supply means for metal M, designed to supply metal M to the second reactor; a sixth supply means for carbon dioxide, designed to supply carbon dioxide to the second reactor; a fifth discharge means for metal carbonate, connected to the first supply means and designed to remove metal carbonate from the second reactor; and at least one sixth discharge means for the further products of the reaction of metal M and carbon dioxide, designed to discharge the further products of the reaction of metal M and carbon dioxide from the second reactor; wherein the third discharge means is connected to the fifth supply means.

In one embodiment, the third discharge means is additionally connected to the third supply means.

In one embodiment, the apparatus further comprises a second electrolysis means for the electrolysis of carbon dioxide, designed to electrolyze carbon dioxide; a ninth discharge means for carbon monoxide, designed to discharge carbon monoxide from the second electrolysis means; a tenth supply means for carbon dioxide, designed to supply carbon dioxide to the second electrolysis means; a tenth discharge means for oxygen, designed to discharge oxygen from the second electrolysis means; optionally a and third reactor for the reaction of chlorine and carbon monoxide, designed to react chlorine and carbon monoxide to give phosgene, diphosgene and/or triphosgene and connect it to the second supply means for phosgene, diphosgene and/or triphosgene; and a ninth supply means for carbon monoxide, connected to the ninth discharge means for carbon monoxide and designed to supply carbon monoxide to the first reactor for the reaction of metal carbonate and phosgene, diphosgene and/or triphosgene or to the third reactor for the reaction of chlorine and carbon monoxide.

BRIEF DESCRIPTION OF THE DRAWINGS

Example aspects and embodiments are described in detail below with reference to the drawings, in which.

DETAILED DESCRIPTION

Figure 1:
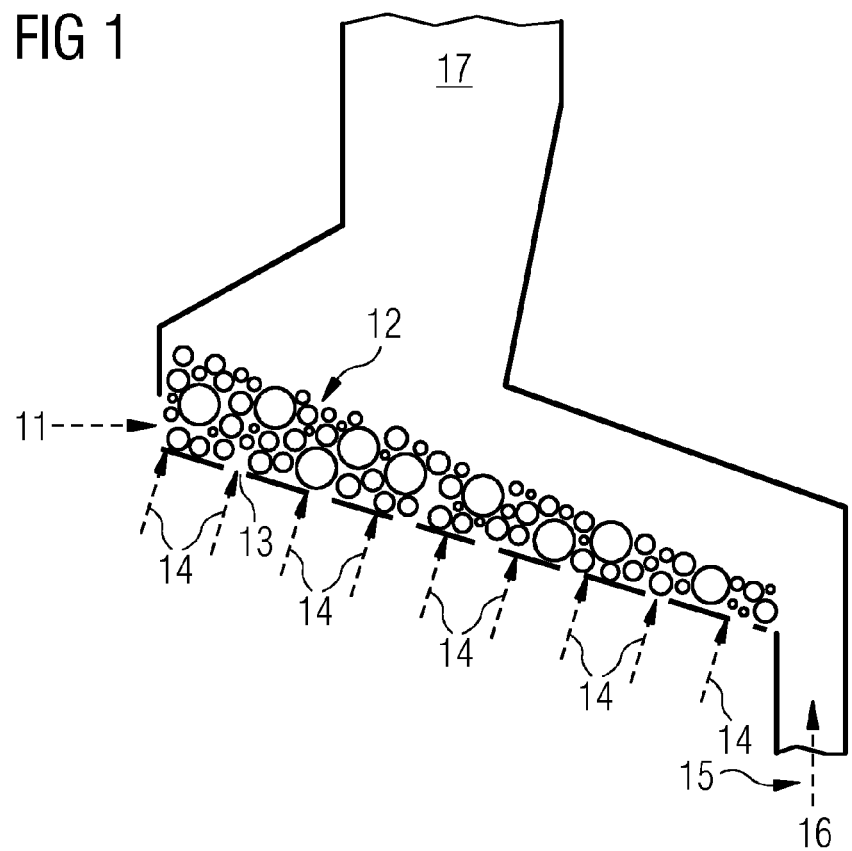
FIG. 1 shows schematically a grid reactor which can be used in a method of the invention and in an apparatus of the invention.

The inventors have found that an efficient preparation, efficient not least in terms of energy, of metal chloride from metal carbonate is made possible by carrying out the reaction using phosgene, diphosgene and/or triphosgene, which supplies energy for the process. Through the reaction with phosgene, an "adduct" of chlorine and carbon monoxide, and/or with the derivatives diphosgene and/or triphosgene, from which phosgene can be liberated, in the form of a direct chlorination, the direct chlorination of metal carbonate can be broken down into component reactions, two for example, which are electrochemically advantageous.

In accordance with the invention, moreover, an efficient sequence of chemical reactions has been found for producing metal chloride and ultimately metal M from metal carbonate.

Furthermore, the exothermic reactions that proceed ensure a rapid reaction course, which may result in a high throughput, and additionally the energy liberated can be utilized for—for example—power station technology.

According to one aspect, the present invention relates to a method for producing metal chloride $M^{x+}Cl_x^-$, where a metal carbonate as solid is reacted with phosgene, diphosgene and/or triphosgene to give metal chloride $M^{x+}Cl_x^-$, the metal M being selected from the group of the alkali metals, alkaline earth metals, Al and Zn, preferably Li and Mg, more preferably Li, and x corresponding to the valence of the metal cation.

According to a further aspect, the present invention relates to an apparatus for reacting metal carbonate as solid with phosgene, diphosgene and/or triphosgene to give metal chloride $M^{x+}Cl_x^-$, the metal M being selected from the group of the alkali metals, alkaline earth metals, Al and Zn, preferably Li and Mg, more preferably Li, and x corresponding to the valence of the metal cation, comprising a first reactor for the reaction of metal carbonate and phosgene, diphosgene and/or triphosgene;

a first supply means for metal carbonate, designed to introduce metal carbonate as solid into the first reactor;

a second supply means for phosgene, diphosgene and/or triphosgene, designed to introduce phosgene, diphosgene and/or triphosgene into the first reactor;

a first discharge means for metal chloride, designed to remove metal chloride from the first reactor; and a second discharge means for gaseous products of the reaction of metal carbonate and phosgene, diphosgene and/or triphosgene, designed to remove gaseous products of the reaction of metal carbonate and phosgene, diphosgene and/or triphosgene from the first reactor.

The invention relates, moreover, according to a further aspect, to an apparatus for reacting metal carbonate as solid with phosgene, diphosgene and/or triphosgene to give metal chloride $M^{x+}Cl_x^-$, the metal M being selected from the group of the alkali metals, alkaline earth metals, Al and Zn, preferably Li and Mg, more preferably Li, and x corresponding to the valence of the metal cation, metal M being additionally added as reactant, comprising a first reactor for the reaction of metal carbonate and phosgene, diphosgene and/or triphosgene;

a first supply means for metal carbonate, designed to introduce metal carbonate as solid into the first reactor;

a second supply means for chlorine, designed to introduce chlorine into the first reactor;

a first discharge means for metal chloride, designed to remove metal chloride from the first reactor;

optionally at least one seventh supply means for carbon monoxide and/or phosgene, diphosgene and/or triphosgene, designed to introduce carbon monoxide and/or phosgene, diphosgene and/or triphosgene into the first reactor; and a second discharge means for gaseous products of the reaction of metal carbonate and phosgene, diphosgene and/or triphosgene, designed to remove gaseous products of the reaction of metal carbonate and phosgene, diphosgene and/or triphosgene from the first reactor, further comprising a third supply means for metal M, designed to introduce metal M into the first reactor.

In the context of the invention it is noted that the equations set out by way of example represent net equations, and the chemical events occurring may be significantly more complex.

The present invention relates in a first aspect to a method for producing metal chloride $M^{x+}Cl_x^-$, wherein metal carbonate as solid is reacted with phosgene, diphosgene and/or triphosgene to give metal chloride $M^{x+}Cl_x^-$, x corresponding to the valence of the metal cation (e.g., 1 for Li, 2 for Mg, 3 for Al). In a method of this kind the metal M is selected from the group of the alkali metals, preferably Li, Na, K, Rb, Cs, alkaline earth metals, preferably Mg, Ca, Sr, Ba, and also Al and Zn. According to particular embodiments, the metal is Li or Mg, and preferably it is Li. Mixtures of the metals and/or metal carbonates and/or metal chlorides are also possible. As a result of the reaction of the metal carbonate with phosgene, diphosgene and/or triphosgene, energy may be released here, and so no additional energy need be supplied, as may be the case for the reaction with other chlorinating agents. According to particular embodiments here, the phosgene, diphosgene and/or triphosgene may be generated in an external reactor or in situ. According to particular embodiments, the phosgene, diphosgene and/or triphosgene are generated in an extra reactor, before they are supplied to the reaction with metal carbonate in a first reactor. In this context, the energy already generated there in the preparation of phosgene, diphosgene and/or triphosgene may be suitably taken off.

By way of example, the exothermic reaction for the conversion of lithium carbonate and phosgene is as follows:

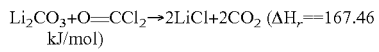

$Li_2CO_3 + O=CCl_2 \rightarrow 2LiCl + 2CO_2$ ($\Delta H_r = -167.46$ kJ/mol)

Similar energies arise for diphosgene and/or triphosgene, since phosgene can be liberated from them, by means of heating, for example. According to particular embodiments, in the method of the invention and also in the apparatus of the invention, phosgene is used without diphosgene and/or triphosgene.

In the text below and also in the context of the patent application, therefore, the term "phosgene" also encompasses diphosgene and/or triphosgene, unless anything different is evident from the context.

According to particular embodiments, the phosgene, diphosgene and/or triphosgene may be prepared in situ, from carbon monoxide and chlorine, for example, by supplying carbon monoxide and chlorine to a first reactor, in which the reaction with metal carbonate takes place as well. In this case it may be of advantage that carbon monoxide and chlorine are more convenient to handle or else more readily available. The quantities of supplied phosgene, diphosgene and/or triphosgene and/or carbon monoxide and chlorine can be adjusted suitably on the basis of simple stoichiometric and process-engineering considerations, on the basis of the quantity of metal carbonate supplied.

According to particular embodiments, metal M is additionally added as a reactant. By this means it is possible, from the metal carbonate, to generate carbon monoxide, which can then be combined with chlorine, allowing the phosgene, diphosgene and/or triphosgene to be used "in situ" in the reactor for the reaction with further metal carbonate and/or with products from the reaction of metal M and metal carbonate-metal oxide, for example. In this case as well the exothermic reactions may be carried by themselves. Moreover, as a result of the in situ preparation of phosgene, diphosgene and/or triphosgene, the supplying of phosgene, diphosgene and/or triphosgene can be avoided, and instead chlorine can be added, which may be more convenient to handle.

Furthermore, according to particular embodiments, the metal M is used together with the metal carbonate, so that there is already reaction of metal with metal carbonate before, for example, chlorine is added. It is also possible for chlorine and carbon monoxide to be prepared in a different way than by the carbon monoxide, from a reaction of this kind between metal M and metal carbonate in situ, in other words in any desired way, for example by additional use of carbon monoxide. This may also be added additionally to a supply of metal M, as for example if the reaction of metal carbonate with metal M is unable to provide sufficient carbon monoxide to cover the CO demand of the reaction through to complete conversion. Instead of carbon monoxide, however, phosgene, diphosgene and/or triphosgene themselves may also additionally be supplied, if insufficient carbon monoxide can be provided through the reaction of metal carbonate with metal M.

According to particular embodiments, the additionally added metal M may also be a metal which differs from the metal ion of the metal carbonate. Thus, for example, where lithium carbonate is the metal carbonate used, lithium, sodium, potassium, calcium and/or magnesium may be added. Generally speaking it is possible to add a metal which is later on not detrimental to the electrolysis of the metal chloride. According to particular embodiments, a metal of this kind, which is different from that of the metal carbonate, may also be advantageous if, for example, a eutectic mixture can be formed for the electrolysis of the metal chloride. According to particular embodiments, the metal M corresponds to that of metal carbonate.

For lithium as metal, for example, the equations of reaction are as set out below.

$Li_2CO_3$ is mixed with metallic lithium. This produces $Li_2O$ and CO:

$Li_2CO_3 + 2Li \rightarrow Li_2O + CO$  $\Delta H_r = -90.29$ kJ/mol

This reaction is inherently exothermic and is therefore able to support itself.

In the same reactor, the lithium oxide can be reacted further with the CO and $Cl_2$ and/or phosgene to give lithium chloride:

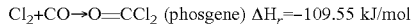

$Cl_2 + CO \rightarrow O=CCl_2$ (phosgene) $\Delta H_r = -109.55$ kJ/mol

Diphosgene and/or triphosgene may also be prepared from phosgene or, alternatively, from carbon monoxide and chlorine directly.

The phosgene can then be reacted further with lithium carbonate, as described above, or else with lithium oxide:

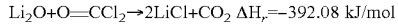

$Li_2O + O=CCl_2 \rightarrow 2LiCl + CO_2$ $\Delta H_r = -392.08$ kJ/mol

The phosgene, diphosgene and/or triphosgene may therefore also be formed in situ directly during the injection of lithium onto lithium carbonate in conjunction with a chlorine atmosphere.

In accordance with the invention it is possible that no additional thermal energy is carried into the reaction, by means of heating devices, for example, although ignition of the reactants for the purpose of starting the reaction may be necessary, by means of suitable devices such as light arcs, lasers, etc. It is also possible to recover thermal energy from the method, by means of one or more heat exchangers, for example, the energy then being able to be used in power station technology, as for example for generating steam to drive steam generators and/or for heating of the metal carbonate and/or the metal M, if supplied, and this may make processing easier. The reaction enthalpies may be of a level such that they are sufficient, as shown above, for utilization in power station technology (similarly to a refuse incineration plant). Similar equations are formed for the other metals M which can be used, where M is selected from the group of the alkali metals, preferably Li, Na, K, Rb, Cs, alkaline earth metals, preferably Mg, Ca, Sr, Ba, and also Al and Zn. According to particular embodiments, the metal is Li, K or Mg, and preferably it is Li or K, more preferably Li.

According to particular embodiments the metal M, where added, is adjusted in a metal/metal carbonate weight ratio such that sufficient carbon monoxide is formed for a reaction, preferably complete, with supplied chlorine; here it is also possible, additionally, for phosgene, diphosgene and/or triphosgene to be added, or for the amount of carbon monoxide generated, where there is additional supplying of carbon monoxide, to be such that the total amount of carbon monoxide is sufficient for a reaction, preferably complete, with chlorine that is supplied. The amounts of generated carbon monoxide, optionally supplied carbon monoxide, supplied chlorine, and optionally supplied phosgene, diphosgene and/or triphosgene, may easily be suitably determined on the basis of stoichiometric and process-engineering considerations, on the basis of the supplied amounts of metal carbonate and metal.

If, for example, there is sufficient metal M present, which is generated, for example, by electrolysis of a metal chloride using excess energy from renewable energies, it is also possible to add a higher proportion of metal M, as for example at times at which there is no excess energy present from renewable energies, so that in that case, current can additionally be generated from the thermal energy additionally generated in the method of the invention. In this case the metal M represents a kind of energy store, which is generated using excess energy from renewable energies and then releases the energy when it is needed.

According to particular embodiments, the metal M in the method of the invention can be used together with the metal carbonate. In this way, therefore, the method can be simplified, as can also the apparatus for implementing the method. Where metal M and metal carbonate are supplied through an opening in the first reactor, it is also possible to provide for the possibility that the release of energy can be optimized suitably by the mixing of metal M and metal carbonate. Metal M can be used in various forms, as for example as solid, in the form of particles, for instance, and/or as liquid, in the form of a melt; in the case of particles or liquid, it may here also be atomized.

In the method of the invention, the phosgene may be added in gaseous form, after cooling optionally in liquid form and/or as a solution in a suitable solvent, or in another form, but it is preferably added in gaseous or liquid form, more preferably gaseous form. Diphosgene and/or triphosgene may be added in liquid form or as solids, or alternatively as gas. Where chlorine and optionally carbon monoxide are added for the in situ generation of phosgene, diphosgene and/or triphosgene, they may be added in a suitable form, preferably gaseous.

According to particular embodiments there is a dry conversion/reaction of metal carbonate, optionally metal M, and phosgene, diphosgene and/or triphosgene—in other words, no solvent is used, and preferably only metal carbonate, optionally metal M, and phosgene, diphosgene and/or triphosgene, and/or optionally carbon monoxide and chlorine, are introduced and reacted in the first reactor. Furthermore, according to particular embodiments, there are no further substances introduced into the circuit that must subsequently be separated off again.

The reaction of the metal carbonate and of the metal M with phosgene, diphosgene and/or triphosgene may produce gaseous products, such as $CO_2$, CO, etc., for example. These products, by way of a discharge means, for example, may be discharged to the atmosphere and/or stored as products of value and/or caused to react further. Thus, for example, excess CO may be reacted with hydrogen to form alkanes, alkenes, alcohols, etc.

The optionally supplied carbon monoxide may come from any desired sources. Industrially, for example, the requisite carbon monoxide may also be prepared by the following reaction:

$CO_2 \rightarrow CO + 1/2 O_2$ $\Delta H_r = 282.97$ kJ/mol

The formation of carbon monoxide is promoted by high temperatures or an oxygen deficit. According to the Boudouard equilibrium, carbon dioxide likewise formed in the course of a combustion may be reacted with carbon to give carbon monoxide:

$CO_2 + C \rightarrow 2CO$ $\Delta H_r = 172.45$ kJ/mol

Preferable, however, is electrochemically prepared CO, which is obtained electrolytically.

This has the advantage that the oxygen obtained at the anode can be easily separated off and utilized. According to particular embodiments, moreover, together with the electrolysis of the metal chloride in this case, the endothermic reactions, in other words those for the preparation of chlorine, carbon monoxide, and metal, can be operated by excess energy, whereas in exothermic reactions, energy can then be released from these reactants, at times for example, where there is no excess energy and/or where additional energy is required.

In methods with a direct reaction with chlorine, the oxygen is obtained in the gas fraction of the reactor and must be separated from the residual gases in a costly and inconvenient procedure. The empirical reaction would proceed very slowly, since the energy conversion is very small:

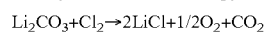
$Li_2CO_3 + Cl_2 \rightarrow 2LiCl + 1/2 O_2 + CO_2$ (Reaction enthalpy: −5 kH/mol)

Only exothermic reactions occur in the first reactor through the method of the invention, whereas the endothermic component reactions are carried out electrochemically, such as, for example, also an electrolysis of the metal chloride to metal M and chlorine, which takes place according to certain embodiments.

The electrochemical preparation of carbon monoxide, by electrolysis, for example, is not particularly restrictive, and can be found, for example, in Y. Hori, Electrochemical CO2 reduction on metal electrodes, in: C. Vayenas, et al. (Eds.), Modern Aspects of Electrochemistry, Springer, New York, 2008, pp. 89-189, a document incorporated by reference with regard to the electrolysis of carbon dioxide. For the electrolysis of $CO_2$, in general, metals are used as catalysts, exemplary metals for this being featured in table 1 below, which is taken from Y. Hori, Electrochemical CO2 reduction on metal electrodes, in: C. Vayenas, et al. (Eds.), Modern Aspects of Electrochemistry, Springer, New York, 2008, pp. 89-189.

The table shows the typical Faraday efficiencies of various metal electrodes. Over Ag, Au, Zn, Pd, and Ga, for example, $CO_2$ is almost exclusively reduced to CO, whereas over copper there are a multiplicity of hydrocarbons as reduction products. Metal electrodes can therefore be selected suitably for the production of carbon monoxide.

TABLE 1

Faraday efficiencies of carbon dioxide over various metal electrodes

| Electrode | CH$_4$ | C$_2$H$_4$ | C$_2$H$_5$OH | C$_3$H$_7$OH | CO | HCOO$^-$ | H$_2$ | Total |
|---|---|---|---|---|---|---|---|---|
| Cu | 33.3 | 25.5 | 5.7 | 3.0 | 1.3 | 9.4 | 20.5 | 103.5 |
| Au | 0.0 | 0.0 | 0.0 | 0.0 | 87.1 | 0.7 | 10.2 | 98.0 |
| Ag | 0.0 | 0.0 | 0.0 | 0.0 | 81.5 | 0.8 | 12.4 | 94.6 |
| Zn | 0.0 | 0.0 | 0.0 | 0.0 | 79.4 | 6.1 | 9.9 | 95.4 |
| Pd | 2.9 | 0.0 | 0.0 | 0.0 | 28.3 | 2.8 | 26.2 | 60.2 |
| Ga | 0.0 | 0.0 | 0.0 | 0.0 | 23.2 | 0.0 | 79.0 | 102.0 |
| Pb | 0.0 | 0.0 | 0.0 | 0.0 | 0.0 | 97.4 | 5.0 | 102.4 |
| Hg | 0.0 | 0.0 | 0.0 | 0.0 | 0.0 | 99.5 | 0.0 | 99.5 |
| In | 0.0 | 0.0 | 0.0 | 0.0 | 2.1 | 94.9 | 3.3 | 100.3 |
| Sn | 0.0 | 0.0 | 0.0 | 0.0 | 7.1 | 88.4 | 4.6 | 100.1 |
| Cd | 1.3 | 0.0 | 0.0 | 0.0 | 13.9 | 78.4 | 9.4 | 103.0 |
| Tl | 0.0 | 0.0 | 0.0 | 0.0 | 0.0 | 95.1 | 6.2 | 101.3 |
| Ni | 0.0 | 0.1 | 0.0 | 0.0 | 0.0 | 1.4 | 88.9 | 92.4 |
| Fe | 0.0 | 0.0 | 0.0 | 0.0 | 0.0 | 0.0 | 94.8 | 94.8 |
| Pt | 0.0 | 0.0 | 0.0 | 0.0 | 0.0 | 0.1 | 95.7 | 95.8 |
| Ti | 0.0 | 0.0 | 0.0 | 0.0 | 0.0 | 0.0 | 99.7 | 99.7 |

The equations of reaction below set out by way of example the reactions at the anode and at the cathode for reduction over a silver cathode. The reductions over the other metals are analogous to this.

Cathode: $2CO_2 + 4e^- + 4H^+ \rightarrow 2CO + 2H_2O$

Anode: $2H_2O \rightarrow O_2 + 4H^+ + 4e^-$

The equation of reaction below represents the entire reaction for this, and also the standard enthalpy of formation:

$CO_2 \rightarrow CO + 1/2 O_2 \quad \Delta H_r = 282.97 \text{ kJ/mol}$

Suitable electrolysis means/electrolysis cells for implementing an electrolysis of carbon dioxide, comprising suitable anodes, cathodes, optionally membranes, etc., can be selected appropriately and are not restricted, not even in terms of their type.

Electrolytes used may comprise aqueous systems with KHCO$_3$ or similar salts. One of the primary issues with this electrolysis is that the electrolyte not only has to be very highly conductive, in order to have a low voltage drop, but also has to have a good CO$_2$ solubility, in order to make sufficient CO$_2$ available at the electrode for reduction. This is difficult owing to the low solubility of CO$_2$ in water (~3 g of CO$_2$ per l at 1 bar and 20° C.) Specifically at high current densities, the scission of water is dominant generally in aqueous systems, since insufficient CO$_2$ molecules are available at the cathode for reduction.

The use of ionic liquids to reduce CO$_2$ has hitherto not been extensively described in the literature. The two publications below utilize the known compound [EMIM]BF$_4$ (formula depicted below):

Reduction of CO$_2$ to CO over silver electrode: B. A. Rosen, A. Salehi-Khojin, M. R. Thorson, W. Zhu, D. T. Whipple, P. J. A. Kenis, and R. I. Masel, Science 334, 643-644 (2011).

Reduction of CO$_2$ to CO over bismuth electrode: J. L. DiMeglio, and Rosenthal Joel, Journal of the American Chemistry Society 135, 8789-8801 (2013).

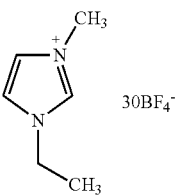

1-Ethyl-3-methylimidazolium tetrafluoroborate ([EMIM]BF$_4$)

According to particular embodiments, no particular limitation applies to the cathode space and the anode space in the electrolysis of carbon dioxide.

In the electrolysis, the carbon dioxide may be present in the electrolyte in dissolved form and/or gaseous form.

There are certain embodiments where it is environmentally preferable for the electrolyte to be present, further, in the form of an aqueous solution. The electrolyte here is not particularly limited as long as it permits a (possibly physical) dissolving of the carbon dioxide. For example, it may comprise KCl, K$_2$SO$_4$, KHCO$_3$ or mixtures thereof. In principle, any combinations of cations and anions can serve as electrolyte salts provided they allow the current densities required for a CO$_2$ electrolysis.

The electrolysis according to particular embodiments may be carried out using a CO$_2$ reduction catalyst as cathode and/or an oxidation catalyst as anode. The cathode-side reaction here depends on cathode material and is not limited as long as it generates CO. Examples of suitable cathode material include gold, silver, zinc, palladium, gallium, cadmium, and also mixtures or alloys of the materials. There are no particular limits on the anode material, which encompasses all anode materials which can be used in an electrolysis of water, examples being anodes based on platinum, ruthenium or graphite.

According to particular embodiments, the cathode-side electrolyte and the anode-side electrolyte may be identical. In such embodiments an electrolysis cell without membrane may be enough for the electrolysis of carbon dioxide. This is not, however, to rule out the electrolysis cell having a membrane in such embodiments, but this entails additional cost and complexity with regard to the membrane and to the voltage applied.

In particular embodiments, the electrolysis cell for the carbon dioxide electrolysis has a membrane which divides the cathode space and the anode space of the electrolysis cell, in order to prevent mixing of the electrolytes. The membrane in this case is not particularly restricted as long as it divides the cathode space and the anode space. In particular it substantially prevents the crossover of carbon dioxide and/or its dissolved form to the anode. One preferred membrane is an ionic exchange membrane, based on polymer, for example. One preferred material of an ionic exchange membrane is a sulfonated tetrafluoroethylene polymer such as Nafion®, as for example Nafion® 115. Besides polymer membranes it was also possible for ceramic membranes to be used, examples being those referred to in EP 1685892 A1.

There are no particular restrictions on the electrolyte for the carbon dioxide electrolysis, provided that it allows (possibly physical) dissolving of the carbon dioxide. It may for example comprise KCl, KBr, KI, $K_3PO_4$, $K_2SO_4$, $KHCO_3$ or mixtures thereof. The presence of more than one compound in the electrolyte or the electrolyte solution is not excluded. In principle, any combinations of cations and anions may serve as electrolyte salts, provided they allow the current densities required.

In particular embodiments the electrolyte comprises an ionic component such as a salt. This component preferably possesses a low viscosity at room temperature. Materials of this kind are referred to as ionic liquid. Ionic liquids according to particular embodiments are organic salts having a melting point of below 300° C., preferably below 100° C., more preferably below 50° C., which can be added to the electrolyte according to particular embodiments, optionally in addition to the aforementioned KCl, $K_2SO_4$, $KHCO_3$ or mixtures thereof.

Ionic liquids by way of example are those based on: imidazolium, pyridinium, pyrollidinium, piperidinium, organically substituted phosphonium, organically substituted sulfonium, morpholinium, guanidinium cations, with appropriate anions.

These anions may be halides, or complex halides such as $BF_4^-$ or $PF_6^-$, carboxylates, sulfates, triflates, bis(trifluoromethane-sulfonyl)imides, carbonate or hydrogen carbonate, etc.

In certain embodiments, following the reaction of metal carbonate and metal M with the chlorinating agent, the metal chloride is converted back to metal M, preferably by electrolysis. In addition to electrolysis, the conversion may also take place in another suitable way.

For lithium, for example, the equation of reaction is as follows:

$LiCl \rightarrow Li + 1/2 Cl_2$  $\Delta H_r = 408.59$ kJ/mol

There are no particular restrictions here on the preferred electrolysis, which may comprise, for example, the melt flux electrolysis of a compound of the formula $M^{x+}Cl_x^-$, or the electrolysis of an aqueous solution of the compound of the formula $M^{x+}Cl_x^-$.

In order to achieve more efficient electrolysis at low temperatures, for example, a eutectic salt mixture with the compound of the formula $M^{x+}Cl_x^-$ may be generated in order to lower the melting point, for example, by addition of suitable additives, with this salt mixture then being electrolyzed. In that case, however, a possible disadvantage is that the metal M is obtained as a mixture with other metals and may therefore have to be separated from them. If using, for example, Li as metal M, it may be separated off later than low-solubility lithium carbonate, in the case of the electrolysis of LiCl, for example, and so such a disadvantage does not automatically arise.

In particular embodiments, in the reaction of metal carbonate and optionally metal M with phosgene, diphosgene and triphosgene, in accordance with the invention, additional thermal energy may be recovered, and may be into electrical energy and/or used for preheating, where appropriate, metal M and/or the metal carbonate. The electrical energy can also be used for the electrolysis of metal chloride, as set out above, or in the electrolysis of carbon dioxide, where the latter is supplied. According to preferred embodiments, the energy for the electrolytic conversion of $M^{x+}Cl_x^-$ to M and $Cl_2$ and also, optionally, for the electrolytic conversion of $CO_2$ to CO is provided substantially from excess energy from renewable energies and/or conventional power stations, in other words, for example, to an extent of more than 30%, preferably more than 70%, more preferably more than 80%, and very preferably more than 90%, based on the energy requirement of the electrolysis in question. Excess energy from renewable energies is available for these purposes, for example, when more power is provided by renewable and/or conventional energy sources than is drawn off by the consumers. The reference here more particularly is to the energy which is provided in excess by renewable energy sources such as solar plants, wind plants, water power plants, geothermal plants, bio power plants (biomass) or the like and which cannot be drawn off by consumers locally, regionally and/or supra regionally at the time of its generation. It is possible here that energy is also acquired from other sources, as for example from conventional power sources and/or from the above-generated energy in the reaction of metal carbonate and optionally metal M with phosgene, diphosgene and/or triphosgene. According to particularly preferred embodiments, the energy which is used for the electrolysis of the compound of the formula $M^{x+}Cl_x^-$, and/or for the electrolytic conversion of $CO_2$ to CO, is acquired 100% from renewable energy sources; for the operation of the electrolysis means, energy which is not directly associated with the electrolysis of the compound of the formula $M^{x+}Cl_x^-$, or with the electrolysis of $CO_2$, such as for lighting purposes or to operate pumps, etc., for example, may also come from other energy sources, but also from renewable energy sources.

According to particular embodiments, the metal M generated is reacted at least partly, as for example to an extent of more than 20 wt %, more than 50 wt %, or more than 80 wt %, more than 90 wt % or more than 95 wt %, with carbon dioxide to give metal carbonate, thus forming a metal circuit. Also conceivable is a complete reaction (100 wt %) of the metal M produced with carbon dioxide to give metal carbonate. This may be dependent, for example, on the market demand for the metal M and/or else on the availability of energy, such as excess energy from renewable energies, for example. Alternatively, the metal M may also be reacted after a first, different reaction with carbon dioxide to give metal carbonate, for example by initial preparation of metal nitride, which then reacts, after hydrolysis, with carbon dioxide to give metal carbonate. There may also be both a direct reaction of the metal M with carbon dioxide and a first different reaction of the metal M, with nitrogen, for example, and subsequent reaction with carbon dioxide, in which case, here as well, more than 20 wt %, more than 50 wt %, or more than 80 wt %, more than 90 wt % or more than 95 wt %, of the metal M may be reacted. Here again, complete reaction (100 wt %) of the metal M produced to give metal carbonate is conceivable.

In a metal circuit of this kind, the individual steps, i.e., the reaction of metal carbonate and optionally metal M with phosgene, diphosgene and/or triphosgene, the reaction of the metal chloride to give metal M and chlorine, optionally the generation of CO, as for example the electrolytic conversion of $CO_2$ to CO, and also the reaction of the metal M with carbon dioxide, may also take place at different times, as for example on different days, months or seasons, according for example to the availability of excess energy from renewable energies, and also at different locations; in this case, the individual compounds produced, metal chloride, metal M, chlorine, and metal carbonate, and also, where appropriate, carbon monoxide, may in that case be transported to the individual locations in a suitable way, as for example by rail, truck, ship, conveyor belt, pipe, etc., and may be stored there and/or, optionally, at the location of their generation. It is also possible, from the chlorine produced, to regenerate phosgene, diphosgene and/or triphosgene and/or chlorine as such, optionally together with carbon dioxide, to use it in the case of an additional addition of metal M to the metal carbonate during its reaction, and so to store it or transport it.

The process and also an apparatus for generating metal carbonate from metal M and carbon dioxide are not subject to any particular restriction and may include, for example, combustion of metal M, optionally with melting and/or preheating of the metal M, in a carbon dioxide-containing atmosphere, optionally with ignition of the metal M, and here as well the individual operations which require energy may be carried out using, for example, excess energy from renewable energies, or alternatively, optionally, energy from an exothermic combustion of metal M with the carbon dioxide. In the reaction of metal M and carbon dioxide or carbon dioxide-containing atmosphere, which may also comprise air, nitrogen, etc., for example, it is also possible for various, possibly gaseous products of value to be obtained, such as acetylene, CO, hydrogen, oxygen, ammonia, etc., which may be reacted further or stored and/or used as such. In this context it may also be possible that the metal carbonate is obtained in a mixture with other solids, from which it can be separated where appropriate.

According to particular embodiments, the reaction of metal carbonate and optionally metal M with phosgene, diphosgene and/or triphosgene takes place in a grate reactor or in a mechanically moved fixed-bed reactor or in a cyclone reactor.

The grate reactor, the mechanically moved fixed-bed reactor, and the cyclone reactor here are not subject to particular restriction in accordance with the invention.

According to particular embodiments, the reaction takes place in a grate reactor wherein the phosgene, diphosgene and/or triphosgene and/or chlorine and optionally carbon monoxide, in the case where metal M is added as a gas, are added cocurrently with the metal carbonate and optionally metal M, and/or the chlorinating agent is preheated.

An exemplary grate reactor is shown in FIG. 1. Via a supply means 11 for metal carbonate, the metal carbonate is introduced into the grate reactor, and so a metal carbonate bed 12 is formed on the grate 13; the supplying of metal carbonate may also take place, optionally, with metal M, as for example through a joint opening or through separate openings and/or supply means. The supplying 14 for the phosgene, diphosgene and/or triphosgene takes place through the grate 13. As shown in FIG. 1, the supplying 14 of the phosgene, diphosgene and/or triphosgene may take place over the entire grate 13, but it is not impossible for the phosgene, diphosgene and/or triphosgene to be also supplied 14 only in partial regions of the grate 13, as for example near to the supply means 11 for metal carbonate, and/or for the supplying 14 of the phosgene, diphosgene and/or triphosgene to take place with different amounts of substance and/or masses and/or volumes at different locations of the grate 13. Also possible, instead of phosgene, diphosgene and/or triphosgene, or in addition to phosgene, diphosgene and/or triphosgene, it is possible to supply chlorine and optionally carbon dioxide, depending on the supplying of metal M, not only by joint but also by separate supply means. Moreover, the metal carbonate supplied and optionally the metal M may, according to particular embodiments, be heated prior to being supplied, via a heating means, for example, and/or by heated off gas and/or heated solid and/or heated liquid, in the operation of the invention. At the end, the reacted and/or possibly unreacted solid can be taken off via a takeoff means 15 for solid comprising metal chloride, as for example through a drop shaft 16. Gaseous products of the reaction of the metal carbonate and the phosgene, diphosgene and/or triphosgene may be taken off via a takeoff means for gaseous products of the reaction of metal carbonate and phosgene, diphosgene and/or triphosgene.

Furthermore, a grate reactor, according to particular embodiments, may comprise one or more cooling means and/or heat exchangers. Heat exchangers may be provided, for example, in the reaction chamber, and convert the generated heat into steam, which can then be used, for example, to operate generators.

Grates are established for converting solids with long residence times, and one example thereof is grate firing, as set out in Loo, Sjaak van; Koppejan, Jaap: Handbook of Biomass Combustion. London: Earthscan, pp. 134-144, 2008 by way of example. The principle of grate firing is well known and widely developed. As also shown by way of example in FIG. 1, a solid participating in the reaction may be supplied at the upper end of the grate 13.

Figure 2:
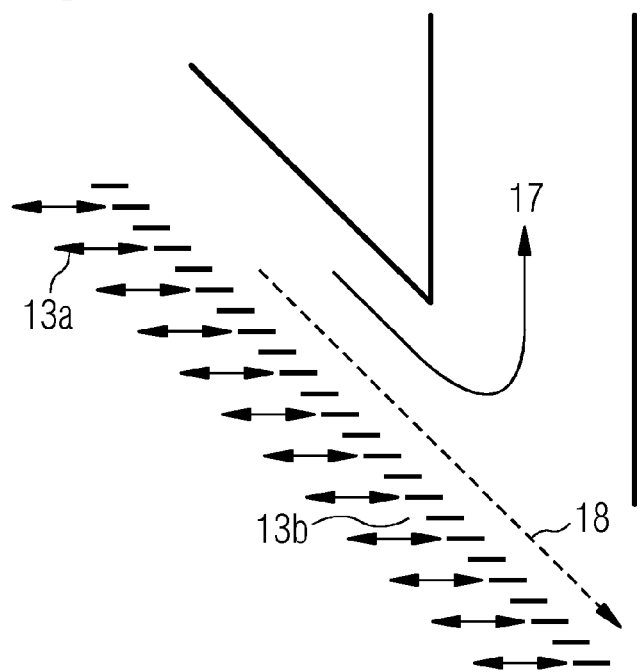
FIG. 2 shows schematically a detail view of an exemplary embodiment of a grid reactor which can be used in a method of the invention and in an apparatus of the invention.

Since the solid has to be transported from the reaction space via the grate 13, in order to ensure continuous operation of the reactor, the grate, according to particular embodiments, consists of moving parts, allowing the solid to be transported. FIG. 2 outlines the principle of an exemplary advancer grate for such transport. With this grate, the grate 13 is constructed from individual bars 13a, 13b, of which, for example, every second bar 13a is movable horizontally, whereas the other bars 13b are fixed. As a result, both transport and stoking of the solid can be efficiently ensured. Here, all movable bars, for example, may possess a common drive and so be moved in equal phase.

Another option is to divide the bars into groups or even to drive them individually, allowing the reaction process to be controlled very precisely and ensuring a complete reaction, as set out by DE 10137520 A1. An appropriate movement pattern of the grate rods may allow control and standardization of the layer thickness of the fuel/solid lying on the grate, as solids stream 18 comprising metal carbonate, optionally metal M and/or metal chloride. In connection with the exemplary process gas supplied comprising the phosgene, diphosgene and/or triphosgene and/or chlorine and optionally carbon monoxide from the underside of the grate (undergrate), therefore, the bed of solids has a homogeneous flow through it; alternatively, the process gas may also be otherwise supplied. The variant depicted, with the through-flow from the underside, may result in minimization of the dust output as well as the uniform reaction of the solid. In order to ensure both uniform complete reaction and low dust discharge, according to particular embodiments, the layer thickness may be monitored, using appropriate sensors and/or cameras, for example, and/or there may be controlled supplying of the phosgene, diphosgene and/or triphosgene and/or of the chlorine and optionally carbon monoxide over the entire bed region.

FIG. 2, moreover, shows the discharge of the exemplary converted process gas by the discharge means 17 in cocurrent, and this may take place by way of example, although it is also possible for two or more discharge means 17 to be provided or for the process gas converted to be discharged in another way. The discharge of the excess, possibly partly unreacted process gas is accomplished, for example, according to particular embodiments, at the end of the solids discharge from the reactor chamber.

An exemplary operation is the reaction of lithium carbonate as metal carbonate with phosgene, diphosgene and/or tri-phosgene in a grate reactor. In order to produce carbon monoxide when using chlorine gas, lithium may be used as metal M. Lithium may be introduced into the reactor in, for example, liquid or atomized form (e.g., via solid lithium, which is heated to a temperature of >180° C. and atomized), or can be admixed in the form of solid lithium particles.

With the above operation, which is exothermic, it is possible, for example, for heat exchangers to be provided in the grate reactor, and to discharge the heat generated, it being possible for steam to be generated from water, the steam operating a generator for power generation. As a result of a cocurrent implementation, according to particular embodiments, the reacted metal carbonate can be cooled toward the discharge means. Where metal is added, such as lithium, it is also possible for the amount added to be such as is necessary in order to prevent excessive generation of heat as far as is possible.

According to further particular embodiments, the reaction takes place in a cyclone reactor, which according to particular embodiments is cooled, and/or wherein, optionally, the metal M is introduced at different positions in the reaction region.

Figure 3:
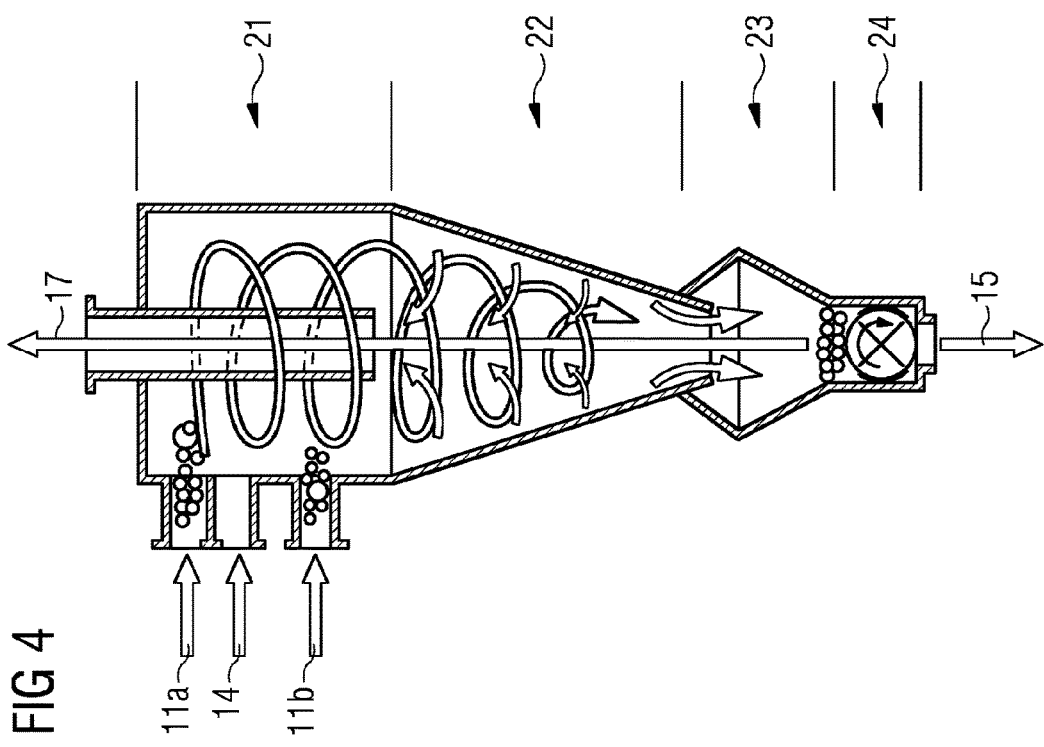
FIG. 3 shows schematically a cyclone reactor which can be used in a method of the invention and in an apparatus of the invention.
Figure 4:
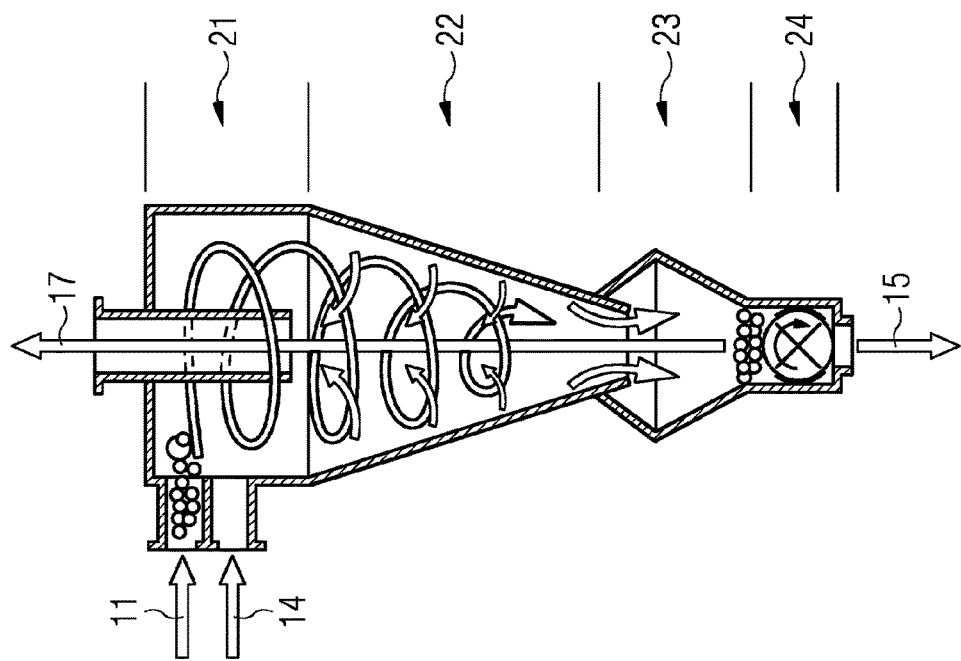
FIG. 4 shows schematically a further cyclone reactor which can be used in a method of the invention and in an apparatus of the invention.

Exemplary cyclone reactors are shown in FIGS. 3 and 4, with the cyclone reactors in FIGS. 3 and 4 being largely of the same construction, except that the cyclone reactor shown in FIG. 3 comprises a supply means 11 for metal carbonate, whereas the cyclone reactor shown in FIG. 4 has a separate supply means 11a for metal carbonate and is a separate supply means 11b for metal M. Both cyclone reactors shown, moreover, have a supply 14 for phosgene, diphosgene and/or triphosgene and, in the case of FIG. 4, moreover, for chlorine and optionally carbon monoxide, a discharge means 15 for solid material comprising metal chloride, and a discharge means 17 for gaseous products of the reaction of metal carbonate and phosgene, diphosgene and/or triphosgene, in which case it has components comprising, for example, a reaction region 21, in the form for example of a rotationally symmetrical upper part, a separation region 22, which for example has a conical design, as shown in the figure, a letdown chamber 23, and a star wheel 24 as an example of a discharge means for solids, of the kind present, for example, in a cyclone separator. Instead of the supply 14 in FIG. 4 for phosgene, diphosgene and/or triphosgene, chlorine and optionally carbon monoxide, it is also possible for various supply devices to have been provided for phosgene, diphosgene and/or triphosgene, chlorine and optionally carbon monoxide in each case, and, where there is sufficient supply of chlorine and optionally carbon monoxide, it may also be unnecessary, optionally, for any phosgene, diphosgene and/or triphosgene to be supplied. Alternatively the cyclone reactor of the invention may have a different construction. It is also possible, moreover, to provide a plurality of discharge means 17 or to configure the discharge of the reacted process gas differently. The solid discharged may also comprise not only metal chloride but also other substances such as unreacted reactants or others. The cyclone reactor may comprise one or more cooling elements and/or cooling devices and/or heat exchangers, which are not shown, and in the heat exchangers it is possible for steam to be generated, which can be used to generate power in generators.

By way of example, a cycle reactor can be used for the reaction of $Li_2CO_3$ with phosgene, diphosgene and/or triphosgene to give LiCl, the reaction taking place, for example, in the form of a cyclone separator. Here the lithium carbonate and the phosgene, diphosgene and/or triphosgene, for example, are blown tangentially into a rotationally symmetrical upper part, as reaction region 21, and accordingly are fluidized with one another and set into rotation. Since the desired reaction of the two reactants to give lithium chloride is exothermic, cooling is additionally required, and may take place, for example, by means of one or more heat exchangers.

Furthermore, the $Li_2CO_3$ may be admixed with pure lithium, leading possibly to formation of carbon monoxide, which can be reacted with chlorine to give phosgene, diphosgene and/or triphosgene, and so here chlorine gas and possibly carbon monoxide may be supplied additionally to or instead of phosgene, diphosgene and/or triphosgene. This lithium may be introduced into the reactor for example, either in solid form, as lithium particles, for example, or as liquid, jetted lithium. For more effective control of the reaction process it is conceivable for the lithium to be introduced at different positions in the reaction region, as also shown in FIG. 4.

As a result of gravity and of rotation, both the solid (e.g., LiCl) and the gaseous (e.g., $O_2$, $CO_2$) reaction products run on a spiral trajectory from the reaction region 21 downward into the conical separation region 22. The tapering in the separation region 22 causes the rotational velocity to go up increasingly, and so solid particles are spun to the walls by the centrifugal force, and in that process are slowed down to an extent such that they part from the flow and fall downward into the letdown chamber 23. The gases separated as a result can then be taken off from the reactor upward by a central dip tube. The solids separated in the letdown chamber 23 can be removed during operation by way of a star wheel 24, for example.

According to particular embodiments, moreover, the walls of the cyclone reactor may be cooled in order to take off excess heat, which can be used again to generate steam for the operation of generators.

The present invention further relates to an apparatus in which the method of the invention can be carried out.

According to one aspect, the present invention relates to an apparatus for the reaction of metal carbonate as solid with phosgene, diphosgene and/or triphosgene to give metal chloride $M^{x+}Cl_x^-$, the metal M being selected from the group of the alkali metals, alkaline earth metals, Al and Zn, preferably Li and Mg, more preferably Li, and x corresponding to the valence of the metal cation, comprising a first reactor for the reaction of metal carbonate and the chlorinating agent;

a first supply means for metal carbonate, designed to introduce metal carbonate as solid into the first reactor;

a second supply means for phosgene, diphosgene and/or triphosgene, designed to introduce phosgene, diphosgene and/or triphosgene into the first reactor;

a first discharge means for metal chloride, designed to remove metal chloride from the first reactor; and a second discharge means for gaseous products of the reaction of metal chloride and phosgene, diphosgene and/or triphosgene, designed to remove gaseous products of the reaction of metal carbonate and phosgene, diphosgene and/or triphosgene from the first reactor.

According to particular embodiments, an apparatus of this kind may further comprise a third supply means for metal M, designed to introduce metal M into the first reactor.

According to a further aspect, the present invention relates to an apparatus for reacting metal carbonate as solid with phosgene, diphosgene and/or triphosgene to give metal chloride $M^{x+}Cl_x^-$, the metal M being selected from the group of the alkali metals, alkaline earth metals, Al and Zn, preferably Li and Mg, more preferably Li, and x corresponding to the valence of the metal cation, metal M being additionally added as reactant, comprising a first reactor for the reaction of metal carbonate and the chlorinating agent;

a first supply means for metal carbonate, designed to introduce metal carbonate as solid into the first reactor;

a seventh supply means for chlorine, designed to introduce chlorine into the first reactor;

a first discharge means for metal chloride, designed to remove metal chloride from the first reactor;

optionally at least one eighth supply means for carbon monoxide and/or phosgene, diphosgene and/or triphosgene, designed to introduce carbon monoxide and/or phosgene, diphosgene and/or triphosgene into the first reactor; and a second discharge means for gaseous products of the reaction of metal chloride and phosgene, diphosgene and/or triphosgene, designed to remove gaseous products of the reaction of metal carbonate and phosgene, diphosgene and/or triphosgene from the first reactor, further comprising a third supply means for metal M, designed to introduce metal M into the first reactor.

In such embodiments the apparatus of the invention may further comprise a second electrolysis unit for the generation of carbon monoxide from carbon dioxide, from which carbon monoxide is supplied via a discharge means to an optional eighth supply means for carbon monoxide. In that case the second electrolysis unit for generating carbon monoxide from carbon dioxide may additionally comprise a feed for carbon dioxide and a feed for water, and a discharge means for oxygen or the like.

In accordance with the invention, according to particular embodiments, it is not ruled out that with the first discharge means for metal chloride, other solids or other substances, as well as the metal chloride, are also removed from the first reactor, examples including unreacted metal carbonate and/or metal M, and also further reaction products of metal carbonate and/or metal M with the chlorinating agent.

In particular embodiments, the first reactor for the reaction of metal carbonate and the chlorinating agent is a grate reactor or a mechanically moved fixed-bed reactor or a cyclone reactor. In the apparatus of the invention, moreover, metal M and metal carbonate may be supplied into the first reactor via a common opening in the first reactor.

According to particular embodiments, the apparatus of the invention may further comprise an electrolysis means for metal chloride, designed to electrolyze metal chloride to give metal M and chlorine, a fourth supply means for metal chloride, connected to the first discharge means for metal chloride and designed to supply the metal chloride to the electrolysis means, a third discharge means for metal M, designed to remove metal M from the electrolysis means, and a fourth discharge means for chlorine, designed to remove chlorine from the electrolysis means. Also present possibly, for example, is an additional discharge means, designed to discharge further reaction products of the electrolysis of metal chloride, as for example in the reaction of a solution of metal chloride, in which case beforehand a solvent such as water, etc., has been supplied to the metal chloride, from the electrolysis means. There are no particular restrictions here on the construction of the electrolysis means, and it may encompass commonly used electrolysis means, such as, for example, for melt flux electrolysis or for electrolysis of solutions, preferably for melt flux electrolysis.

According to particular embodiments, it is not ruled out that with the third discharge means for metal M, other solids or other substances, as well as the metal M, are also removed, such as, for example, flux auxiliaries, unreacted metal chloride and/or further reaction products of the electrolysis.

The apparatus of the invention may further comprise, or additionally comprise in accordance with particular embodiments, a second reactor for the reaction of metal M with carbon dioxide to give metal carbonate, designed to react metal M with carbon dioxide, a fifth supply means for metal M, designed to supply metal M to the second reactor, a sixth supply means for carbon dioxide, designed to supply carbon dioxide to the second reactor, a fifth discharge means for metal carbonate, connected to the first supply means and designed to remove the metal carbonate from the second reactor, and at least one sixth discharge means for the further products of the reaction of metal M and carbon dioxide, designed to discharge the further products of the reaction of metal M and carbon dioxide from the second reactor. Encompassed here may also be two or more discharge means for the further products of the reaction of metal M and carbon dioxide. There are no particular restrictions on the second reactor here, and it may for example be a combustion reactor.

According to particular embodiments, it is not ruled out that with the fifth discharge means for metal carbonate, other solids or other substances, as well as the metal carbonate, are removed, such as, for example, unreacted metal M and/or further reaction products of the reaction of metal M and carbon dioxide.

According to particular embodiments, an apparatus of the invention comprises an electrolysis means for metal chloride, designed to electrolyze metal chloride to give metal M and chlorine;

a fourth supply means of metal chloride, connected to the first discharge means for metal chloride and designed to supply the metal chloride to the electrolysis means;

a third discharge means for metal M, designed to remove metal M from the electrolysis means;

a fourth discharge means for chlorine, designed to remove chlorine from the electrolysis means;

a second reactor for the reaction of metal M with carbon dioxide to give metal carbonate, designed to react metal M with carbon dioxide;

a fifth supply means for metal M, designed to supply metal M to the second reactor;

a sixth supply means for carbon dioxide, designed to supply carbon dioxide to the second reactor;

a fifth discharge means for metal carbonate, connected to the first supply means and designed to remove metal carbonate from the second reactor; and at least one sixth discharge means for the further products of the reaction of metal M and carbon dioxide, designed to discharge the further products of the reaction of metal M and carbon dioxide from the second reactor;

wherein the third discharge means is connected to the fifth supply means.

Here again, according to particular embodiments, it is not ruled out that with the third discharge means for metal M, other solids or other substances, as well as the metal M, are removed, such as, for example, flux auxiliaries, unreacted metal chloride and/or further reaction products of the electrolysis, and/or that with the fifth discharge means for metal carbonate, other solids or other substances, as well as the metal carbonate, are removed, such as, for example, unreacted metal M and/or further reaction products of the reaction of metal M and carbon dioxide. According to particular embodiments, the third discharge means is additionally connected to the third supply means. In this way, moreover, metal M can be recycled, and so no addition or less addition of metal M to the method of the invention is necessary. In this context, however, it is not ruled out that further metal M is supplied to the first reactor via a further, separate third supply means or via the same third supply means.

According to particular embodiments, an apparatus of the invention further comprises a second electrolysis means for the electrolysis of carbon dioxide, designed to electrolyze carbon dioxide; a ninth discharge means for carbon monoxide, designed to discharge carbon monoxide from the second electrolysis means;

a tenth supply means for carbon dioxide, designed to supply carbon dioxide to the second electrolysis means; a tenth discharge means for oxygen, designed to discharge oxygen from the second electrolysis means; optionally a and third reactor for the reaction of chlorine and carbon monoxide, designed to react chlorine and carbon monoxide to give phosgene, diphosgene and/or triphosgene and connect it to the second supply means for phosgene, diphosgene and/or triphosgene; a ninth supply means for carbon monoxide, connected to the ninth discharge means for carbon monoxide and designed to supply carbon monoxide to the first reactor for the reaction of metal carbonate and phosgene, diphosgene and/or triphosgene or to the third reactor for the reaction of chlorine and carbon monoxide.

According to particular embodiments, an apparatus of the invention comprises a third reactor for the reaction of chlorine and carbon monoxide, designed to react chlorine and carbon monoxide to give phosgene, diphosgene and/or triphosgene and connect it to the second supply means for phosgene, diphosgene and/or triphosgene. From this reactor it is then possible for the phosgene, diphosgene and/or triphosgene to be supplied to the first reactor for the reaction of metal carbonate and phosgene, diphosgene and/or triphosgene. In such embodiments the phosgene, diphosgene and/or triphosgene is prepared outside the first reactor.

Furthermore, the first and/or second reactor and/or the electrolysis means may also comprise additional means such as one or more cooling means, heating means, heat exchangers, pumps, etc. Such means may also be provided on the various supply and discharge means. The nature of the supply and discharge means is subject to any particular restriction, and may be selected or provided appropriately— for example, as opening, grate, lattice, drop shaft, etc. The connection between the various supply and discharge means, as described by way of example above and below, may be provided in a suitable way, as for example by conveyor belts, pipes, etc., but also in the sense of stores and suitable transport facilities.

Furthermore, the first reactor and also the electrolysis means, the second reactor, the third reactor and/or the second electrolysis means may also be present at different locations, and so need not necessarily be connected by pipes, conveyor belts or the like, with the connection also possibly being accomplished via transport facilities such as ships, freight transport by rail, truck, etc. An advantage of this is that the steps which require energy, such as one or both electrolysis steps, for example, can take place at sites at which excess energy is present as a general rule, whereas, for example, the exothermic processes or method steps can be carried out at places at which excess energy is present only rarely or else never, and so in this way a kind of "energy transport" takes place.

The above embodiments, configurations and developments can be combined arbitrarily with one another in so far as is rational. Further possible configurations, developments, and implementations of the invention also encompass combinations not explicitly stated of invention features described before or below with reference to the working examples. In particular, the skilled person will also add individual aspects, as improvements or supplements, to the respective basic form of the present invention.

Examples of apparatus of the invention are shown diagrammatically in FIGS. 5 to 17. In the various embodiments, in the first and/or, where present, second reactor, there may in each case be heat exchangers and/or cooling means, etc., and also further means on the various supply and/or discharge means and also on the electrolysis means E provided.

Figure 5:
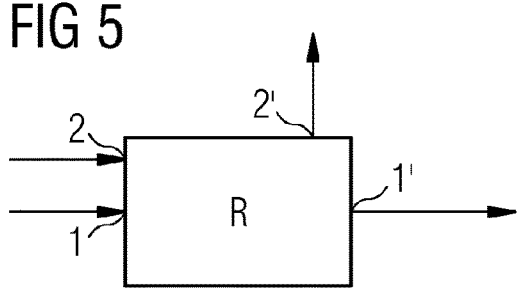
FIG. 5 shows schematically an exemplary embodiment of the present invention.

FIG. 5 shows a first exemplary embodiment in which metal carbonate is supplied via a first supply means 1 for metal carbonate to the first reactor R for the reaction of metal carbonate with solid phosgene, diphosgene and/or triphosgene to give metal chloride. Via a second supply means 2 for phosgene, diphosgene and/or triphosgene, moreover, the first reactor R is supplied with phosgene, diphosgene and/or triphosgene. From the first reactor R, then, metal chloride is discharged via a first discharge means 1' for metal chloride, and gaseous products of the reaction of metal carbonate and phosgene, diphosgene and/or triphosgene are discharged via a second discharge means 2' for gaseous products of the reaction of metal carbonate and phosgene, diphosgene and/or triphosgene.

Figure 6:
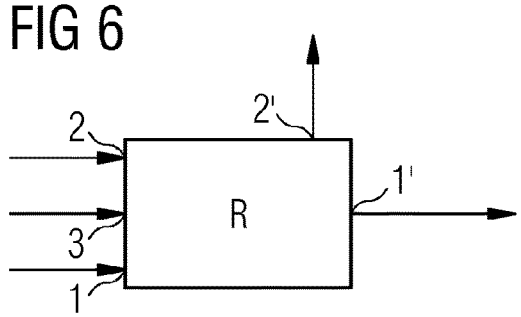
FIG. 6 shows schematically a further exemplary embodiment of the present invention.

A second exemplary embodiment is shown in FIG. 6, in which, additionally, metal M is supplied via a third supply means 3 for metal M to the first reactor R via a separate opening in comparison to the supply means 1 for metal carbonate. In alternative embodiments, the metal carbonate and the metal M may also be supplied by a common opening. In that case the streams of the first supply means 1 for metal carbonate and of the third supply means 3 for metal M may be unified directly at the first reactor R or even upstream of said reactor.

Figure 7:
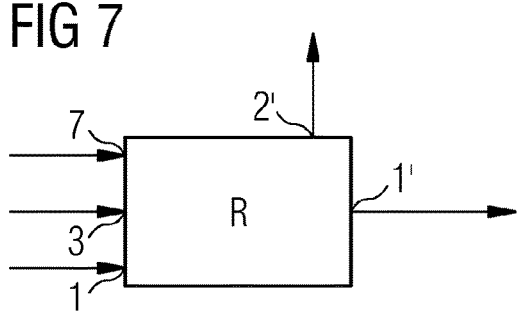
FIG. 7 shows schematically yet another exemplary embodiment of the present invention.
Figure 8:
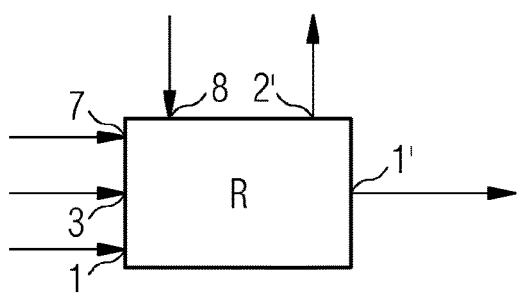
FIG. 8 represents, furthermore, a further exemplary embodiment of the present invention.

A third exemplary embodiment is shown in FIG. 7, in which, in comparison to the second exemplary embodiment, instead of the second supply means 2 for phosgene, diphosgene and/or triphosgene, there is a seventh supply means 7 for chlorine, the chlorine then reacting with carbon monoxide from the reaction of metal carbonate and metal M to give phosgene, diphosgene and/or triphosgene.

In a fourth exemplary embodiment, moreover, in comparison to the third exemplary embodiment, there is an eighth supply means 8 for carbon monoxide and/or phosgene, diphosgene and/or triphosgene, by which phosgene, diphosgene and/or triphosgene and/or carbon monoxide are supplied, if sufficient carbon dioxide and/or phosgene, diphosgene and/or triphosgene for the reaction of metal carbonate are not present, it also being possible for the supply to take place via two separate eighth supply means 8.

Figure 9:
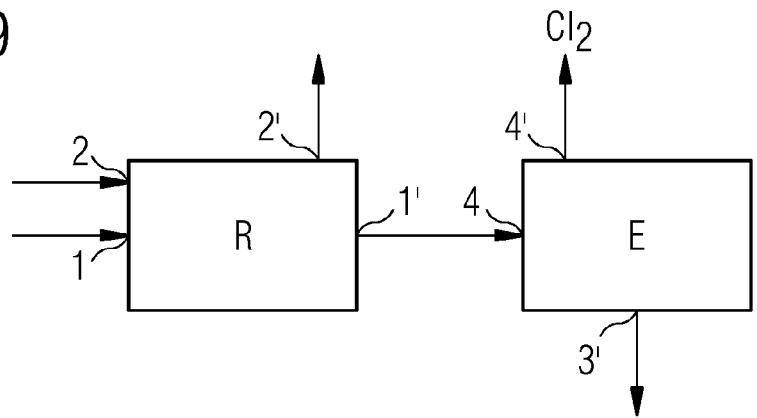
FIG. 9 shows schematically a working example of the present invention which further comprises an electrolysis means.

A fifth exemplary embodiment, which is shown in FIG. 9, corresponds to the first exemplary embodiment, where the metal chloride discharged by the first discharge means 1' for metal chloride is supplied via a fourth supply means 4 for metal chloride to an electrolysis means E, where it is electrolyzed. From the electrolysis means E, metal M is then discharged via a third discharge means 3' for metal, and chlorine via a fourth discharge means 4' for chlorine. In the case of an embodiment of this kind, however, it is not ruled out that the first reactor R is additionally supplied with metal M as in the second exemplary embodiment and optionally with chlorine as in the third exemplary embodiment and optionally with phosgene, diphosgene and/or triphosgene and/or carbon monoxide as in the fourth exemplary embodiment. Also not ruled out is the supplying of metal chloride to the electrolysis means E from a different source than the first reactor R, additionally.

Figure 10:
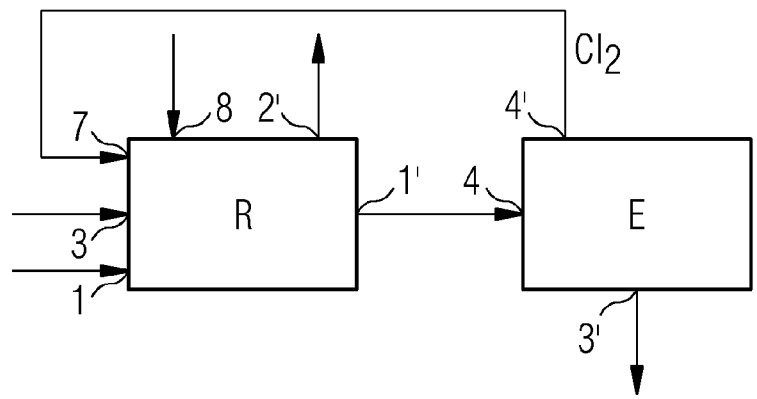
FIG. 10 illustrates a further exemplary embodiment of the present invention which additionally comprises an electrolysis means.

A sixth exemplary embodiment, which is shown in FIG. 10, corresponds to the fifth exemplary embodiment, with metal M, as in the second exemplary embodiment, being supplied via a third supply means 3, chlorine, as in the third exemplary embodiment, being supplied via a seventh supply means 7, and phosgene, diphosgene and/or triphosgene and/or carbon monoxide, as in the fourth exemplary embodiment, being supplied via an eighth supply means 8; however, there is no second supply means 2 for phosgene, diphosgene and/or triphosgene. The fourth discharge means 4' is connected to the seventh supply means 7, and so chlorine is recycled, it not being ruled out that chlorine is also supplied from a further source to the first reactor R and/or else is taken from the electrolysis means E without recycling.

Figure 11:
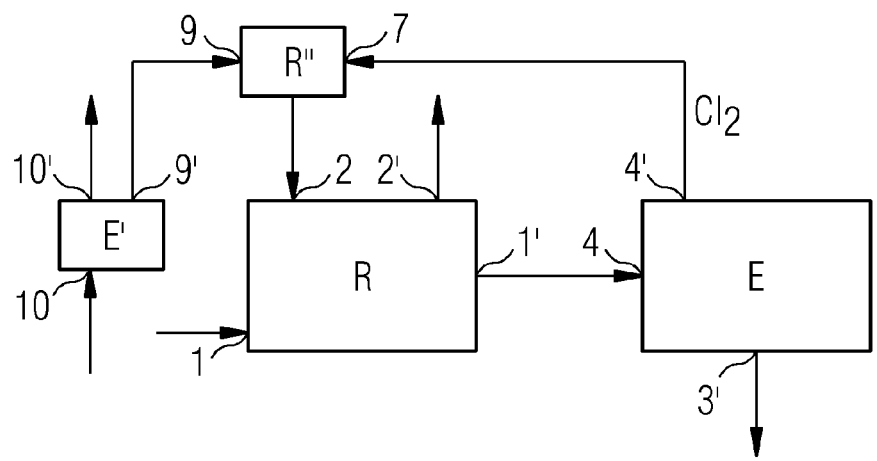
FIG. 11 shows schematically a working example of the present invention, additionally comprising an electrolysis means, a second electrolysis means, and a third reactor.

A seventh exemplary embodiment is shown in FIG. 11, in which, additionally to the sixth exemplary embodiment, there is also a second electrolysis means E' for the electrolysis of carbon dioxide, designed to electrolyze carbon dioxide, a ninth discharge means 9' for carbon monoxide, designed to discharge carbon monoxide from the second electrolysis means E', a tenth supply means 10 for carbon dioxide, designed to supply carbon dioxide to the second electrolysis means, a tenth discharge means 10' for oxygen, designed to discharge oxygen from the second electrolysis means E', a third reactor R" for the reaction of chlorine and carbon monoxide, designed to react chlorine and carbon monoxide to give phosgene, diphosgene and/or triphosgene, and a ninth supply means 9 for carbon monoxide, which is connected to the ninth discharge means 9' for carbon monoxide and is designed to supply carbon monoxide to the third reactor R" for the reaction of chlorine and carbon monoxide; here, in contrast to the sixth exemplary embodiment, there is no third supply means 3 for metal M and no eighth supply means 8, and the chlorine is supplied by the seventh supply means 7 into the third reactor R" and not into the first reactor R. The third reactor R" is connected to the second supply means 2 for phosgene, diphosgene and/or triphosgene, and so phosgene, diphosgene and/or triphosgene is supplied from the third reactor R" to the first reactor R. In an embodiment of this kind it is not ruled out that additionally metal M, chlorine and/or carbon monoxide, phosgene, diphosgene and/or triphosgene are supplied to the first reactor.

Figure 12:
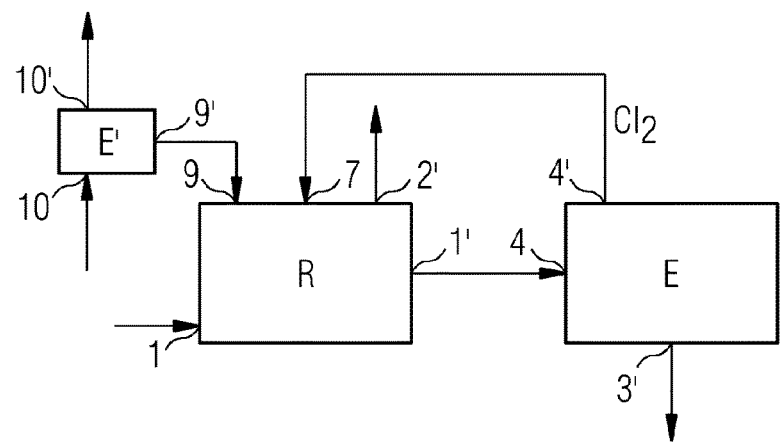
FIG. 12 sets out, furthermore, a further exemplary embodiment of the present invention, which additionally comprises an electrolysis means and a second electrolysis means.

An eighth exemplary embodiment is shown diagrammatically in FIG. 12. In this embodiment, additionally to the sixth exemplary embodiment, there are also a second electrolysis means E' for the electrolysis of carbon dioxide, designed to electrolyze carbon dioxide, a ninth discharge means 9' for carbon monoxide, designed to discharge carbon monoxide from the second electrolysis means E', a tenth supply means 10 for carbon dioxide, designed to supply carbon dioxide to the second electrolysis means, a tenth discharge means 10' for oxygen, designed to discharge oxygen from the second electrolysis means E', and a ninth supply means 9 for carbon monoxide, connected to the ninth discharge means 9' for carbon monoxide and designed to supply carbon monoxide to the first reactor R; here, in contrast to the sixth exemplary embodiment, there are again no third supply means 3 for metal M and no eighth supply means 8. In such an embodiment, also, it is not ruled out that additionally metal M, chlorine and/or carbon monoxide, phosgene, diphosgene and/or triphosgene are supplied to the first reactor.

Figure 13:
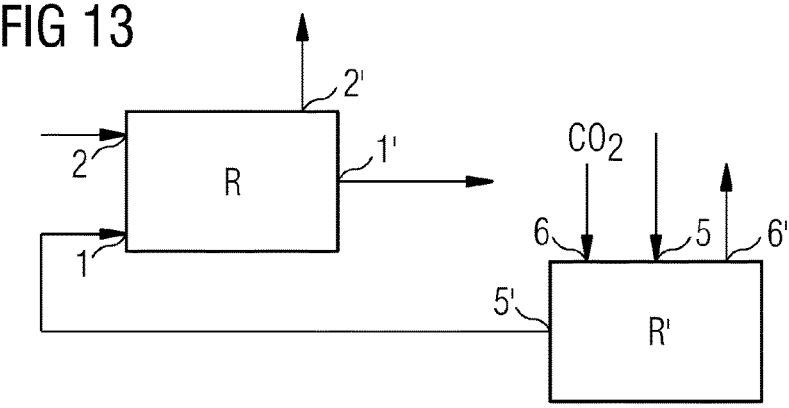
FIG. 13 shows schematically a working example of the present invention, which additionally comprises a second reactor.

A ninth exemplary embodiment is outlined in FIG. 13 and initially corresponds again to the first embodiment, with the metal carbonate, supplied by the first supply means 1 for metal carbonate to the first reactor R, originating from a second reactor R' for the reaction of metal M with carbon dioxide to give metal carbonate, from which it is discharged by a fifth discharge means 5' for metal carbonate, which is connected to the first supply means 1 for metal carbonate. Supplied to the second reactor R' are metal via a fifth supply means 5 for metal, and carbon dioxide via a sixth supply means 6 for carbon dioxide, and, moreover, further products of the reaction of metal M and carbon dioxide are discharged via a sixth discharge means 6' for the further products of the reaction of metal M and carbon dioxide. In the case of an embodiment of this kind, however, it is not ruled out that the first reactor R is additionally supplied with metal M as in the second exemplary embodiment and optionally with chlorine as in the third exemplary embodiment, and optionally with phosgene, diphosgene and/or triphosgene and/or carbon monoxide as in the fourth exemplary embodiment. It is also not ruled out that the first reactor R is additionally supplied with metal carbonate from a different source than the second reactor R'. There may also be preparation of phosgene, diphosgene and/or triphosgene, as in the seventh exemplary embodiment, and/or supply of carbon monoxide as in the eighth exemplary embodiment, in which case the details given for the seventh and/or eighth exemplary embodiment also apply in such embodiments.

Figure 14:
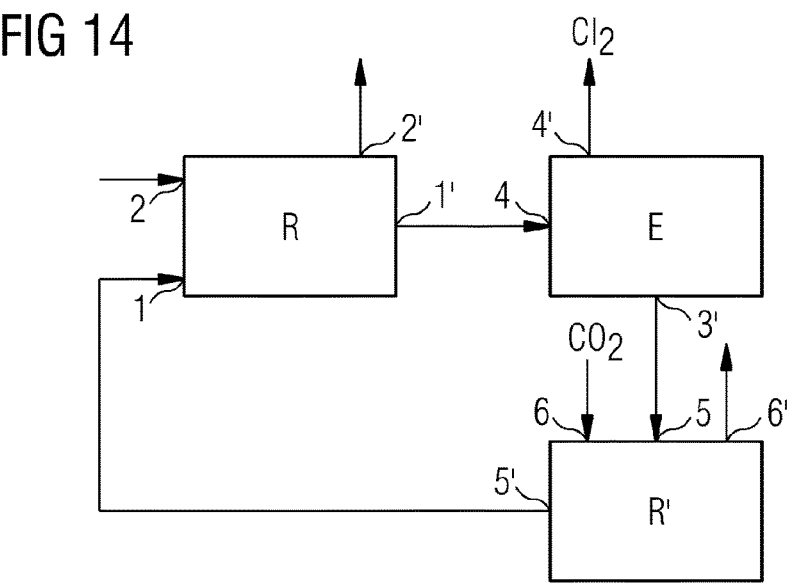
FIG. 14 shows schematically an exemplary embodiment of the present invention, which additionally comprises an electrolysis means and a second reactor.

The exemplary tenth embodiment shown in FIG. 14 corresponds initially to the fifth exemplary embodiment, where the metal carbonate, supplied via the first supply means 1 for metal carbonate to the first reactor R, originates from a second reactor R' for the reaction of metal M with carbon dioxide to give metal carbonate, from which it is discharged by a fifth discharge means 5' for metal carbonate, which is connected to the first supply means 1 for metal carbonate. Supplied to the second reactor R' are metal M via a fifth supply means 5 for metal M, and carbon dioxide via a sixth supply means 6 for carbon dioxide, and, moreover, further products of the reaction of metal M and carbon dioxide are discharged via a sixth discharge means 6' for the further products of the reaction of metal M and carbon dioxide. The metal M for reaction in the second reactor R' originates, at least partly, from the electrolysis means E, and here the fifth supply means 5 for metal M is connected to the third discharge means 3' for metal M. With an embodiment of this kind, however, it is not ruled out that the first reactor R is additionally supplied with metal M as in the second exemplary embodiment and optionally with chlorine as in the third exemplary embodiment, and optionally with phosgene, diphosgene and/or triphosgene and/or carbon monoxide as in the fourth exemplary embodiment. It is also not ruled out that the first reactor R is supplied with metal carbonate from a different source than the second reactor R', and/or that metal chloride is supplied to the electrolysis means E from a different source than the first reactor R, and/or that metal M is supplied to the second reactor R' from a different source than the electrolysis means E, additionally. There may also be preparation of phosgene, diphosgene and/or triphosgene, as in the seventh exemplary embodiment, and/or supply of carbon monoxide as in the eighth exemplary embodiment, in which case the details given for the seventh and/or eighth exemplary embodiment also apply in such embodiments.

Figure 15:
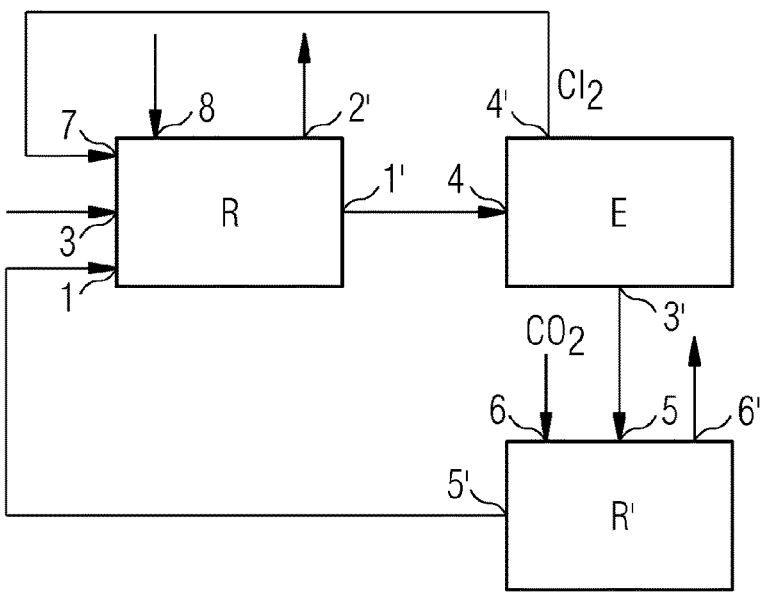
FIG. 15 shows schematically a further exemplary embodiment of the present invention, which additionally comprises an electrolysis means and a second reactor.

The exemplary eleventh embodiment shown in FIG. 15 corresponds to the tenth embodiment, with metal M being supplied, as in the second exemplary embodiment, via a third supply means 3, chlorine, as in the third exemplary embodiment, via a seventh supply means 7, and phosgene, diphosgene and/or triphosgene and/or carbon monoxide, as in the fourth exemplary embodiment, via an eighth supply means 8; in this case, however, there is no second supply means 2 for phosgene, diphosgene and/or triphosgene. The fourth discharge means 4' is connected to the seventh supply means 7, and so chlorine is recycled, it not being ruled out that chlorine is also supplied from a further source to the first reactor R and/or else is taken from the electrolysis means E without recycling. There may also be preparation of phosgene, diphosgene and/or triphosgene, as in the seventh exemplary embodiment, and/or supply of carbon monoxide as in the eighth exemplary embodiment, in which case the details given for the seventh and/or eighth exemplary embodiment also apply in such embodiments.

Figure 16:
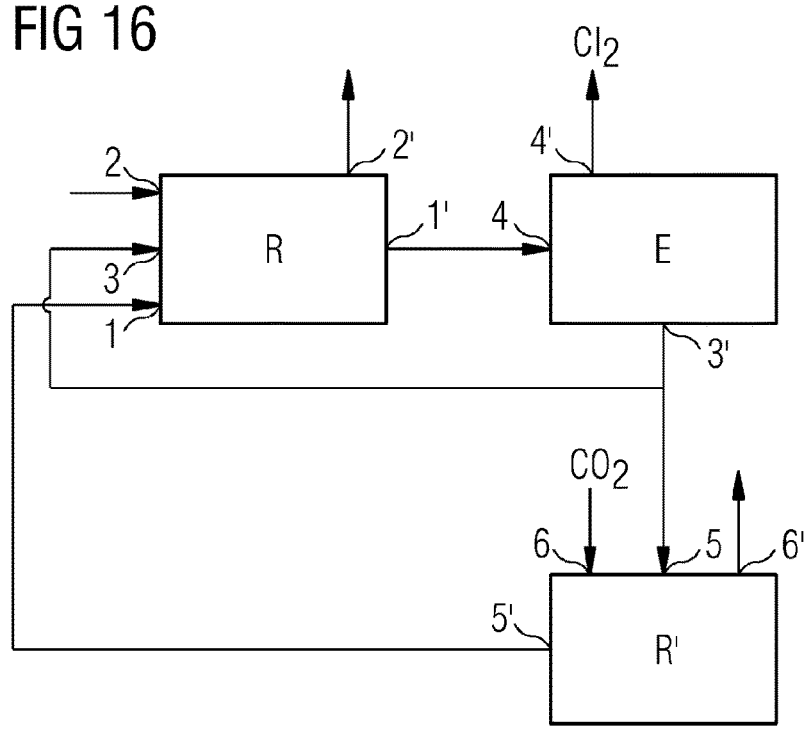
FIG. 16 illustrates a further exemplary embodiment of the present invention, which additionally comprises an electrolysis means and a second reactor.

A twelfth exemplary embodiment is shown in FIG. 16, and corresponds very largely to the tenth exemplary embodiment, except that a portion of the metal M is supplied from the electrolysis means E to the first reactor R; in other words, the third discharge means 3' is additionally connected to a third supply means 3. In an embodiment of this kind, however, it is not ruled out that optionally chlorine, as in the third exemplary embodiment, and optionally phosgene, diphosgene and/or triphosgene and/or carbon monoxide, as in the fourth exemplary embodiment, are supplied. Also not ruled out is that the first reactor R is additionally supplied with metal carbonate from a different source than the second reactor R' and/or that metal chloride is additionally supplied to the electrolysis means E from a different source than the first reactor R, and/or that metal M is additionally supplied to the second reactor R' and/or to the first reactor R from a different source than the electrolysis means E. There may also be preparation of phosgene, diphosgene and/or triphosgene, as in the seventh exemplary embodiment, and/or supply of carbon monoxide as in the eighth exemplary embodiment, in which case the details given for the seventh and/or eighth exemplary embodiment also apply in such embodiments.

Figure 17:
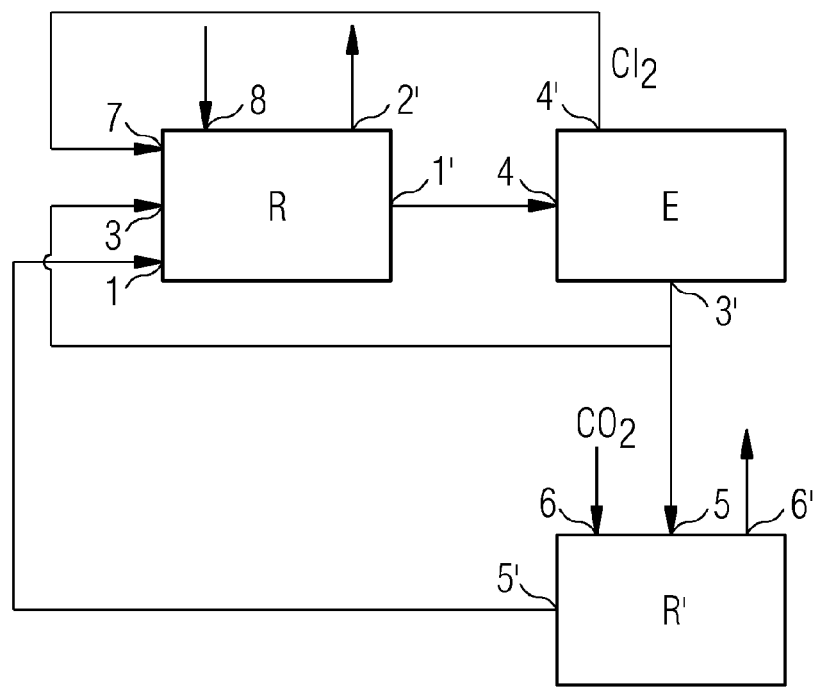
FIG. 17 represents, moreover, a further exemplary embodiment of the present invention, which additionally comprises an electrolysis means and a second reactor.

The exemplary thirteenth embodiment shown in FIG. 17 corresponds to the twelfth embodiment, with chlorine, as in the third exemplary embodiment, being supplied via a seventh supply means 7, and phosgene, diphosgene and/or triphosgene and/or carbon monoxide, as in the fourth exemplary embodiment, being supplied by an eighth supply means 8; however, there is no second supply means 2 for phosgene, diphosgene and/or triphosgene. The fourth discharge means 4' is connected to the seventh supply means 7, and so chlorine is recycled, it not being ruled out that chlorine is also supplied from a further source to the first reactor R and/or else is taken from the electrolysis means E without recycling. Also not ruled out is that the first reactor R is additionally supplied with metal carbonate from a different source than the second reactor R', and/or that metal chloride is supplied to the electrolysis means E from a different source than the first reactor R, and/or that metal M is additionally supplied to the second reactor R' and/or to the first reactor R from a different source than the electrolysis means E. There may also be preparation of phosgene, diphosgene and/or triphosgene, as in the seventh exemplary embodiment, and/or supply of carbon monoxide as in the eighth exemplary embodiment, in which case the details given for the seventh and/or eighth exemplary embodiment also apply in such embodiments.

The present invention relates to a method and apparatus wherein metal carbonate, lithium carbonate for example, is reacted with phosgene, diphosgene and/or triphosgene, where instances of contamination, and costly and inconvenient dehydrating steps, can be avoided.

According to particular embodiments, the phosgene, diphosgene and/or triphosgene is provided from an electrolysis of the metal chloride, lithium chloride for example, and from a completed reaction of the chlorine to give phosgene, diphosgene and/or triphosgene. The metal obtained in the process, lithium for example, can then be combusted, according to particular embodiments, with carbon dioxide to give metal carbonate, lithium carbonate for example.

For the implementation of an efficient metal circuit with metal carbonate, it is preferred for the metal carbonate firing product from a reaction of metal M and carbon dioxide to be able to be reprocessed into metal chloride for the electrolysis. In accordance with the invention, according to particular embodiments, the preparation of metal chloride by the direct chlorination of metal carbonate using the chlorine originating from the electrolysis is utilized for the preparation of phosgene, diphosgene and/or triphosgene.

In a metal circuit of this kind, the following advantages arise:

All operating steps requiring supply of energy can be carried out using electrochemical processes. They may be operated, for example, from excess energy from electricity generation, but in particular not exclusively by means of renewable energy.

The purely thermal operations are exothermic, and so proceed very rapidly and can also be utilized in power station technology terms, since the temperature levels are very high. The number of species involved in the circuit as a whole can be limited to a minimum.

What is claimed is:

1. A method for producing a metal chloride $M^{x+}Cl_x^-$, the method comprising:
   providing a first gas including at least one of diphosgene and triphosgene,
   reacting a solid metal carbonate with the first gas to produce a metal chloride $M^{x+}Cl_x^-$,
   wherein the metal M is selected from the group consisting of alkali metals and alkaline earth metals, and
   wherein x indicates the valence of the metal cation.

2. The method of claim 1, further comprising adding M as an additional reactant.

3. The method of claim 1, wherein
   the first gas is prepared in situ by reaction of chlorine with carbon monoxide.

4. The method of claim 1, further comprising subsequently removing the chlorine from the metal chloride to produce metal M.

5. The method of claim 4, further comprising reacting the produced metal M at least partly with carbon dioxide to produce metal carbonate, to thereby form a metal circuit.

6. The method of claim 1, wherein the reaction is performed in a grid reactor or a mechanically moved fixed-bed reactor or in a cyclone reactor.

7. The method of claim 1, wherein the first gas is prepared by the reaction of carbon monoxide and chlorine.

8. The method of claim 7, wherein the carbon monoxide is produced by a reaction of metal carbonate with the metal M and/or from an electrolysis of carbon dioxide.

* * * * *